(12) United States Patent
Vlas et al.

(10) Patent No.: US 11,978,080 B2
(45) Date of Patent: May 7, 2024

(54) METHOD AND SYSTEM FOR SELECTING PAYMENT OPTION FOR TRANSACTION

(71) Applicant: Verizon Media Inc., New York, NY (US)

(72) Inventors: Sergiu Cristian Vlas, Newburgh, IN (US); Allie Khalil Watfa, Champaign, IL (US); Rahul Chandran, Champaign, IL (US)

(73) Assignee: Yahoo Assets LLC, New York, NY (US)

( * ) Notice: Subject to any disclaimer, the term of this patent is extended or adjusted under 35 U.S.C. 154(b) by 0 days.

(21) Appl. No.: 17/330,866

(22) Filed: May 26, 2021

(65) Prior Publication Data

US 2022/0383354 A1 Dec. 1, 2022

(51) Int. Cl.
*G06Q 30/02* (2023.01)
*G06Q 20/12* (2012.01)
*G06Q 20/22* (2012.01)
*G06Q 30/0207* (2023.01)
*G06Q 30/0283* (2023.01)

(52) U.S. Cl.
CPC ......... *G06Q 30/0215* (2013.01); *G06Q 20/12* (2013.01); *G06Q 20/227* (2013.01); *G06Q 30/0283* (2013.01)

(58) Field of Classification Search
CPC .. G06Q 30/0215; G06Q 20/12; G06Q 20/227; G06Q 30/0283; G06Q 30/0207–30/0277
See application file for complete search history.

(56) References Cited

U.S. PATENT DOCUMENTS

| | | | | |
|---|---|---|---|---|
| 7,630,937 B1* | 12/2009 | Mo | ........................ | G06Q 30/04 705/40 |
| 8,396,794 B1* | 3/2013 | Mo | ........................ | G06Q 20/10 705/40 |
| 8,577,345 B2* | 11/2013 | Dragt | ..................... | G06Q 30/02 455/414.2 |
| 9,589,259 B2* | 3/2017 | McNeel | ............... | G06Q 20/202 |

(Continued)

FOREIGN PATENT DOCUMENTS

WO   WO 2021/207719 A1 * 3/2020

*Primary Examiner* — Thuy N Nguyen
(74) *Attorney, Agent, or Firm* — Cooper Legal Group LLC

(57) ABSTRACT

One or more computing devices, systems, and/or methods are provided. In an example, financial account information associated with a plurality of payment options may be determined. First financial account information of the financial account information is associated with a first payment option of the plurality of payment options. The first financial account information may be indicative of a first rewards profile associated with transactions performed using the first payment option. A request associated with a transaction may be received. A plurality of financial return scores associated with the plurality of payment options may be determined based upon the financial account information and transaction information associated with the transaction. A first financial return score of the plurality of financial return scores may be associated with the first payment option. The first payment option of the plurality of payment options may be selected for the transaction based upon the plurality of financial return scores.

20 Claims, 10 Drawing Sheets

(56) References Cited

U.S. PATENT DOCUMENTS

| | | | |
|---|---|---|---|
| 9,686,646 B1* | 6/2017 | Pecard | G01S 19/13 |
| 9,906,906 B1* | 2/2018 | Pecard | H04W 4/021 |
| 10,580,027 B1* | 3/2020 | Rephlo | G06Q 20/405 |
| 10,909,525 B1* | 2/2021 | Dhodapkar | G06Q 20/3278 |
| 11,157,933 B2* | 10/2021 | Babaria | G06Q 30/0225 |
| 11,321,396 B2* | 5/2022 | Makhija | G06F 16/90335 |
| 2004/0024703 A1* | 2/2004 | Roskind | G06Q 20/102 |
| | | | 705/40 |
| 2011/0119133 A1* | 5/2011 | Igelman | G06Q 30/0261 |
| | | | 707/769 |
| 2011/0153408 A1* | 6/2011 | Foust | H04L 12/1859 |
| | | | 455/414.2 |
| 2013/0115943 A1* | 5/2013 | Bao | H04W 48/16 |
| | | | 455/435.2 |
| 2013/0179245 A1* | 7/2013 | Simonoff | G06Q 30/0222 |
| | | | 705/14.23 |
| 2014/0289822 A1* | 9/2014 | Wilson | H04L 9/0819 |
| | | | 726/5 |
| 2015/0198453 A1* | 7/2015 | Baid | G06Q 30/0259 |
| | | | 705/14.55 |
| 2015/0348006 A1* | 12/2015 | Taveau | G06Q 20/3224 |
| | | | 455/456.2 |
| 2015/0363814 A1* | 12/2015 | Hernandez | G06Q 20/384 |
| | | | 705/14.27 |
| 2016/0217532 A1* | 7/2016 | Slavin | G06Q 30/0276 |
| 2016/0323218 A1* | 11/2016 | Sadanandan | H04L 51/10 |
| 2016/0358144 A1* | 12/2016 | Thrope | H04W 4/029 |
| 2017/0032338 A1* | 2/2017 | Szollar | G06Q 30/0226 |
| 2017/0161768 A1* | 6/2017 | Lopez | G06Q 30/0226 |
| 2017/0193485 A1* | 7/2017 | Wu | G06Q 30/0226 |
| 2017/0287001 A1* | 10/2017 | Zigoris | G06Q 30/0226 |
| 2018/0005259 A1* | 1/2018 | Nair | G06Q 30/0236 |
| 2018/0033090 A1* | 2/2018 | Khan | G06Q 20/3278 |
| 2018/0033244 A1* | 2/2018 | Northrup | G08G 1/0175 |
| 2018/0181981 A1* | 6/2018 | Ahuja | G06Q 30/0238 |
| 2018/0218369 A1* | 8/2018 | Xiao | G06Q 20/20 |
| 2018/0225714 A1* | 8/2018 | Lewis | G06Q 30/0261 |
| 2018/0260833 A1* | 9/2018 | Khan | G06Q 20/3224 |
| 2020/0118155 A1* | 4/2020 | Bloy | G06Q 20/227 |
| 2020/0234268 A1* | 7/2020 | Kohli | G06Q 20/405 |
| 2020/0394638 A1* | 12/2020 | Mcleod | G06Q 20/351 |
| 2021/0326920 A1* | 10/2021 | Yucra Rodriguez | |
| | | | G06Q 30/0232 |
| 2022/0207520 A1* | 6/2022 | Prabhu | G06Q 20/405 |

* cited by examiner

METHOD AND SYSTEM FOR SELECTING PAYMENT OPTION FOR TRANSACTION

BACKGROUND

Various payment mechanisms, such as credit cards, debit cards, gift cards, etc. may be used for purchasing products and/or services. Some payment mechanisms have promotions that may offer rewards for using the payment mechanisms to pay for products and/or services.

SUMMARY

In accordance with the present disclosure, one or more computing devices and/or methods are provided. In an example, financial account information, associated with a plurality of payment options associated with a first user account, may be determined. First financial account information of the financial account information is associated with a first payment option of the plurality of payment options. The first financial account information may be indicative of a first rewards profile associated with transactions performed using the first payment option. A request, associated with a transaction associated with the first user account, may be received. A plurality of financial return scores associated with the plurality of payment options may be determined based upon the financial account information and transaction information associated with the transaction. A first financial return score of the plurality of financial return scores may be associated with the first payment option. The first payment option of the plurality of payment options may be selected for the transaction based upon the plurality of financial return scores.

In an example, financial account information, associated with a plurality of payment options associated with a first user account, may be determined. First financial account information of the financial account information is associated with a first payment option of the plurality of payment options. The first financial account information may be indicative of a first currency profile associated with transactions performed using the first payment option. A request, associated with a transaction associated with the first user account, may be received. A plurality of financial return scores associated with the plurality of payment options may be determined based upon the financial account information and transaction information associated with the transaction. A first financial return score of the plurality of financial return scores may be associated with the first payment option. The first payment option of the plurality of payment options may be selected for the transaction based upon the plurality of financial return scores.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
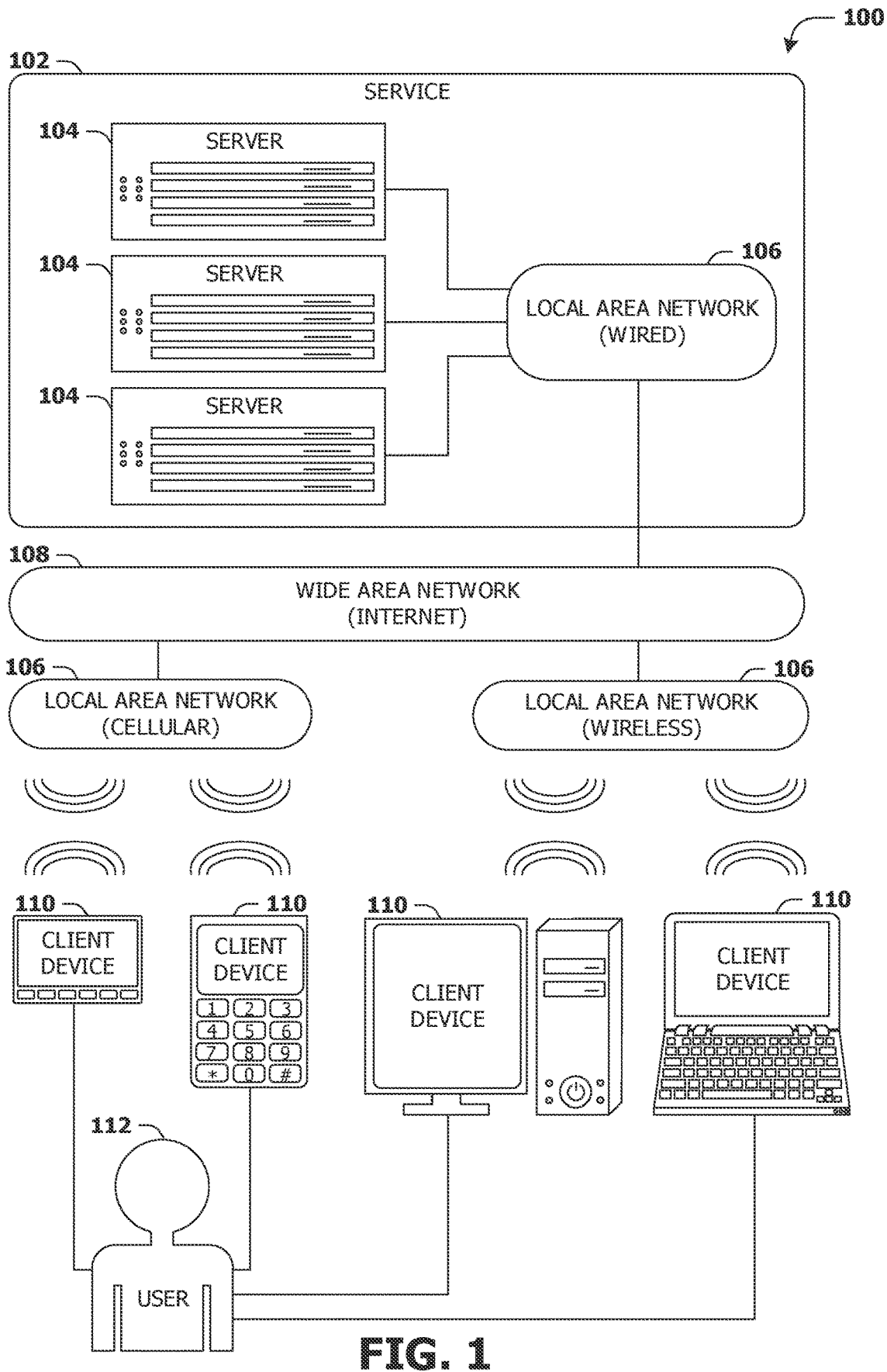
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
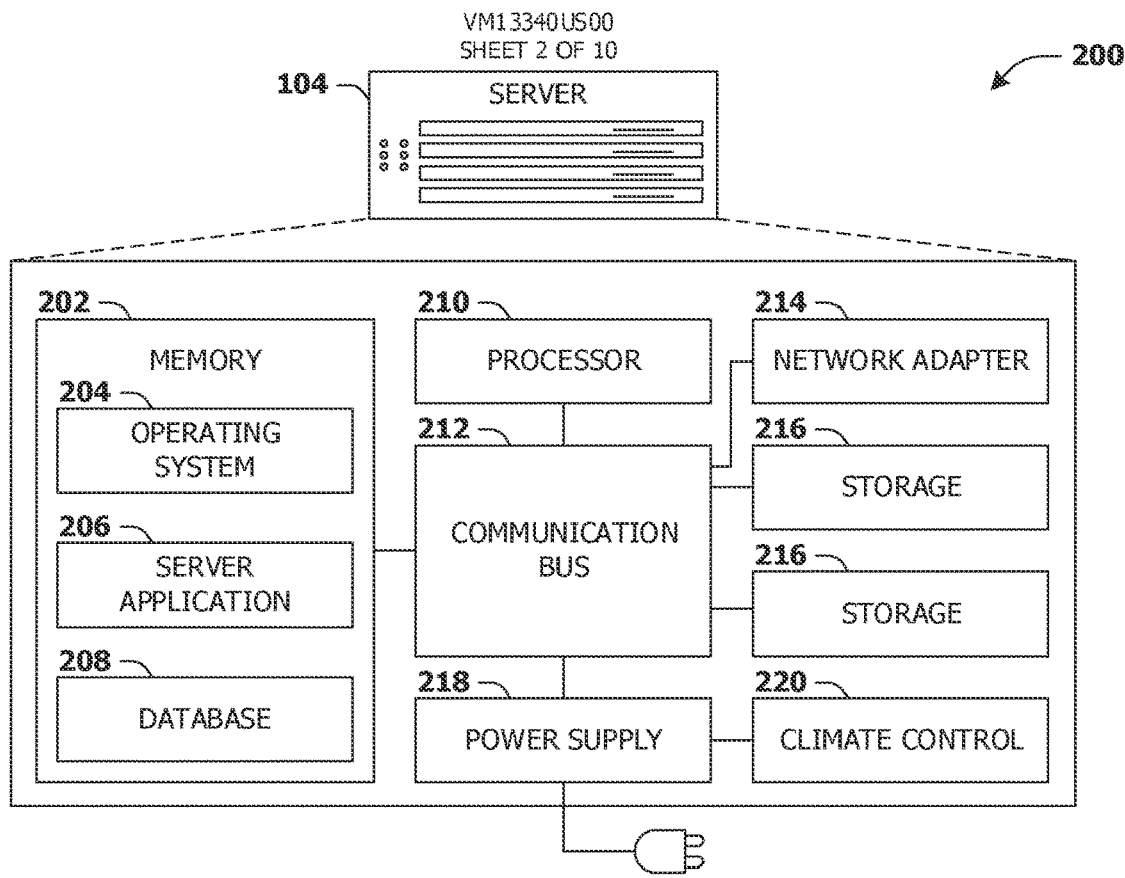
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
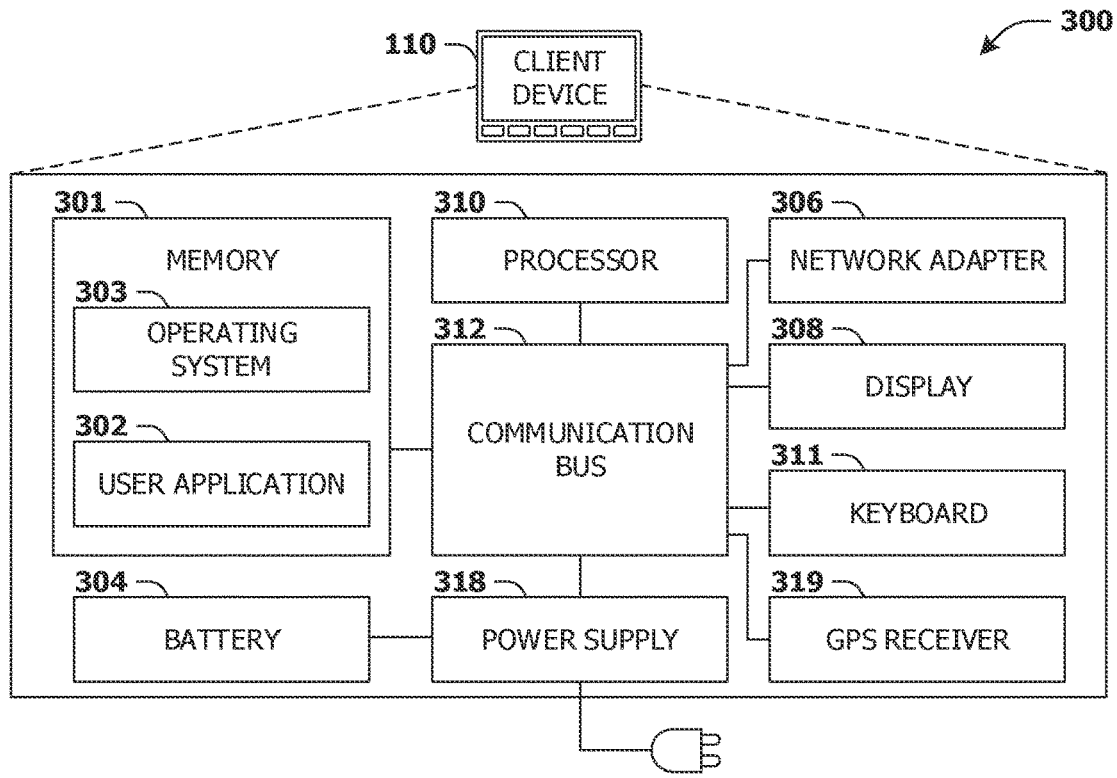
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining financial return scores associated with payment options and/or selecting a payment option based upon the financial return scores are provided. For example, a user may want to purchase one or more products and/or one or more services. The user may have multiple payment options associated with different promotions and may have to choose a payment option of the multiple payment options for the purchase. For example, if the user performs the purchase using a first payment option, the user may receive first rewards in accordance with one or more first promotions associated with the first payment option. Alternatively and/or additionally, if the user performs the purchase using a second payment option, the user may receive second rewards in accordance with one or more second promotions associated with the second payment option, where the second rewards may have at least one of a different type, a different amount, a different value, etc. than the first rewards. The user may not be able to accurately choose a payment option (e.g., the first payment option or the second payment option) for the purchase that would maximize value of rewards provided to the user.

Thus, in accordance with one or more of the techniques presented herein, financial account information, associated with a plurality of payment options associated with the user, may be determined. First financial account information of the financial account information is associated with a first payment option of the plurality of payment options. The first financial account information may be indicative of a first rewards profile associated with transactions performed using the first payment option. A request, associated with a transaction associated with the user, may be received. A plurality of financial return scores associated with the plurality of payment options may be determined based upon the financial account information and transaction information associated with the transaction. A first financial return score of the plurality of financial return scores may be associated with the first payment option. The first payment option of the plurality of payment options may be selected for the transaction based upon the plurality of financial return scores, such as based upon a determination that the first financial return score is the highest financial return score of the plurality of financial return scores. In response to selecting the first payment option for the transaction, the transaction may be performed (e.g., automatically performed) using the first payment option.

Figure 4:
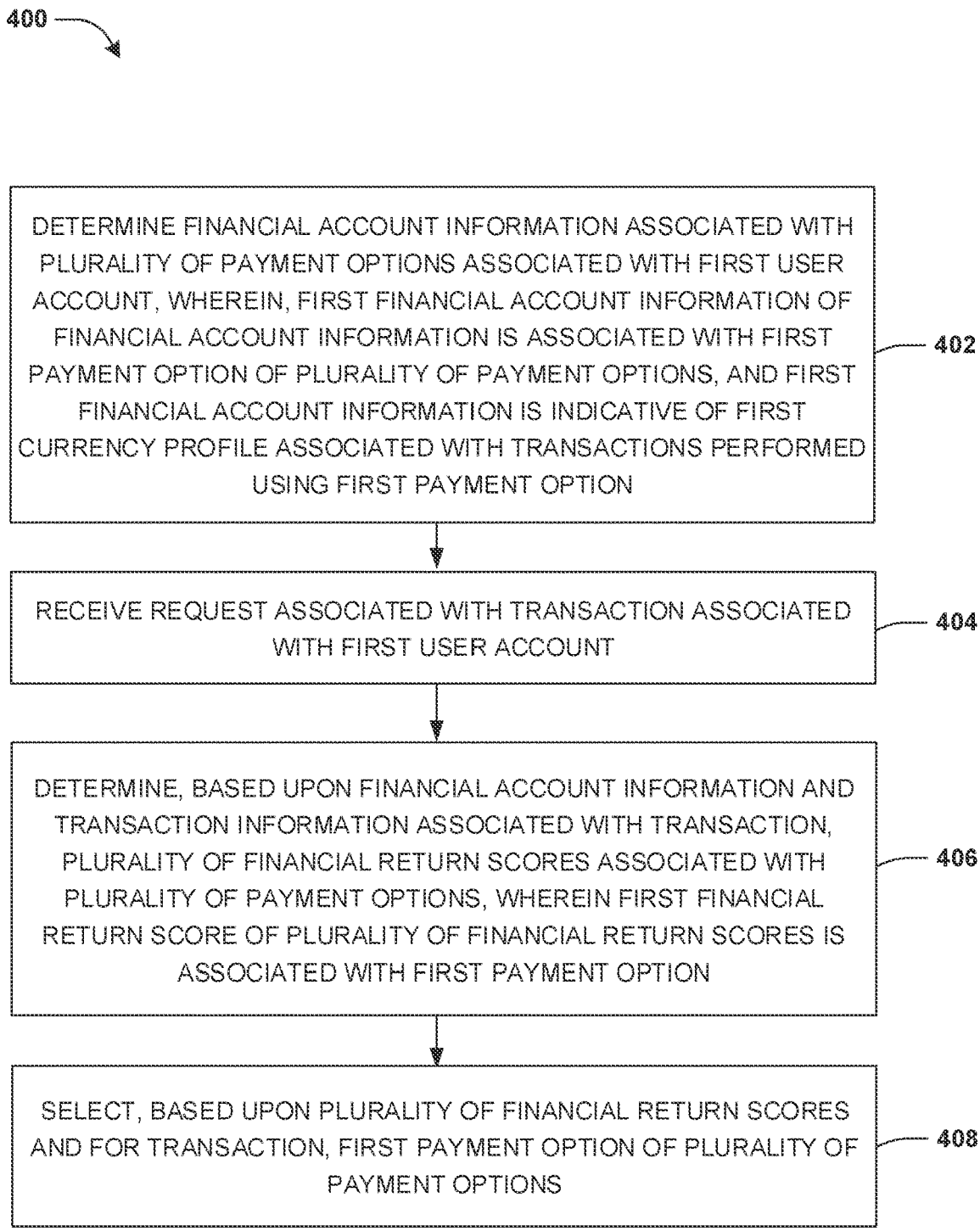
FIG. 4 is a flow chart illustrating an example method for determining financial return scores associated with payment options and/or selecting a payment option based upon the financial return scores.

An embodiment of determining financial return scores associated with payment options and/or selecting a payment option based upon the financial return scores is illustrated by an example method 400 of FIG. 4, and is further described in conjunction with system 501 of FIGS. 5A-5F. A first user, such as user Jill, (and/or a first client device associated with the first user) may access and/or interact with a service, such as a browser, a browser plugin, software, a website, an application, an operating system, etc. that provides a platform for at least one of managing financial accounts, managing transactions, selecting payment options for transactions, performing transactions using selected payment options, etc. In some examples, the platform may be operated and/or controlled by a financial system and/or the first client device. In an example, the first user and/or the first client device may have a first user account with the financial system.

At 402, financial account information associated with a plurality of payment options associated with the first user account (and/or the first user and/or the first client device) may be determined. In some examples, a payment option of the plurality of payment options (and/or each payment option of the plurality of payment options) may be a payment option (e.g., a payment method and/or payment mechanism) for performing a transaction (e.g., at least one of a transfer of funds, a purchase, etc.). Alternatively and/or additionally, a payment option of the plurality of payment options (and/or each payment option of the plurality of payment options) may comprise and/or use a financial account (of the first user, for example) with a financial institution. Alternatively and/or additionally, a payment option of the plurality of payment options (and/or each payment option of the plurality of payment options) may comprise at least one of a credit card (and/or a credit card account), a debit card (and/or a debit card account), a gift card (and/or a gift card account), a store credit account, a bank account, a cryptocurrency in a wallet, an online payment system account (e.g., a payment system that supports online money transfers), a mobile payment system account, etc.

In some examples, for each payment option of the plurality of payment options, the financial account information may comprise a set of financial account information associated with the payment option. For example, first financial account information of the financial account information may be associated with a first payment option of the plurality of payment options, second financial account information of the financial account information may be associated with a second payment option of the plurality of payment options, etc.

In an example, the first financial account information of the financial account information may be indicative of information associated with the first payment option. The first payment option may be a payment option (e.g., a payment method and/or payment mechanism) for performing a transaction (e.g., at least one of a transfer of funds, a purchase, etc.). The first payment option may comprise and/or use a first financial account of the first user with a first financial institution. In an example, the first payment option may comprise at least one of a first credit card (and/or a first credit card account), a first debit card (and/or a first debit card account), a first gift card (and/or a first gift card account), a first store credit account, a first cryptocurrency in a first wallet, etc.

Alternatively and/or additionally, the second financial account information of the financial account information may be indicative of information associated with the second payment option. The second payment option may be a payment option (e.g., a payment method and/or payment mechanism) for performing a transaction (e.g., at least one of a transfer of funds, a purchase, etc.). The second payment option may comprise and/or use a second financial account of the first user with a second financial institution. Alternatively and/or additionally, the second payment option may comprise at least one of a second credit card (and/or a second credit card account), a second debit card (and/or a second debit card account), a second gift card (and/or a second gift card account), a second store credit account, a second cryptocurrency in a second wallet, etc.

In some examples, the first financial account information may be indicative of at least one of an account type associated with the first payment option (e.g., credit, debit, etc.), an account balance associated with the first payment option (e.g., an amount of currency present in the first financial account), a credit card balance associated with the first payment option (e.g., an amount of currency owed to the first financial institution), a credit limit associated with the first payment option (e.g., a maximum amount of credit that the first financial institution extends to the first financial account), an interest rate associated with the first payment option, an annual percentage rate (APR) of the first financial account, a first currency profile (e.g., a first rewards profile) associated with transactions performed using the first payment option, etc.

Figure 5A:
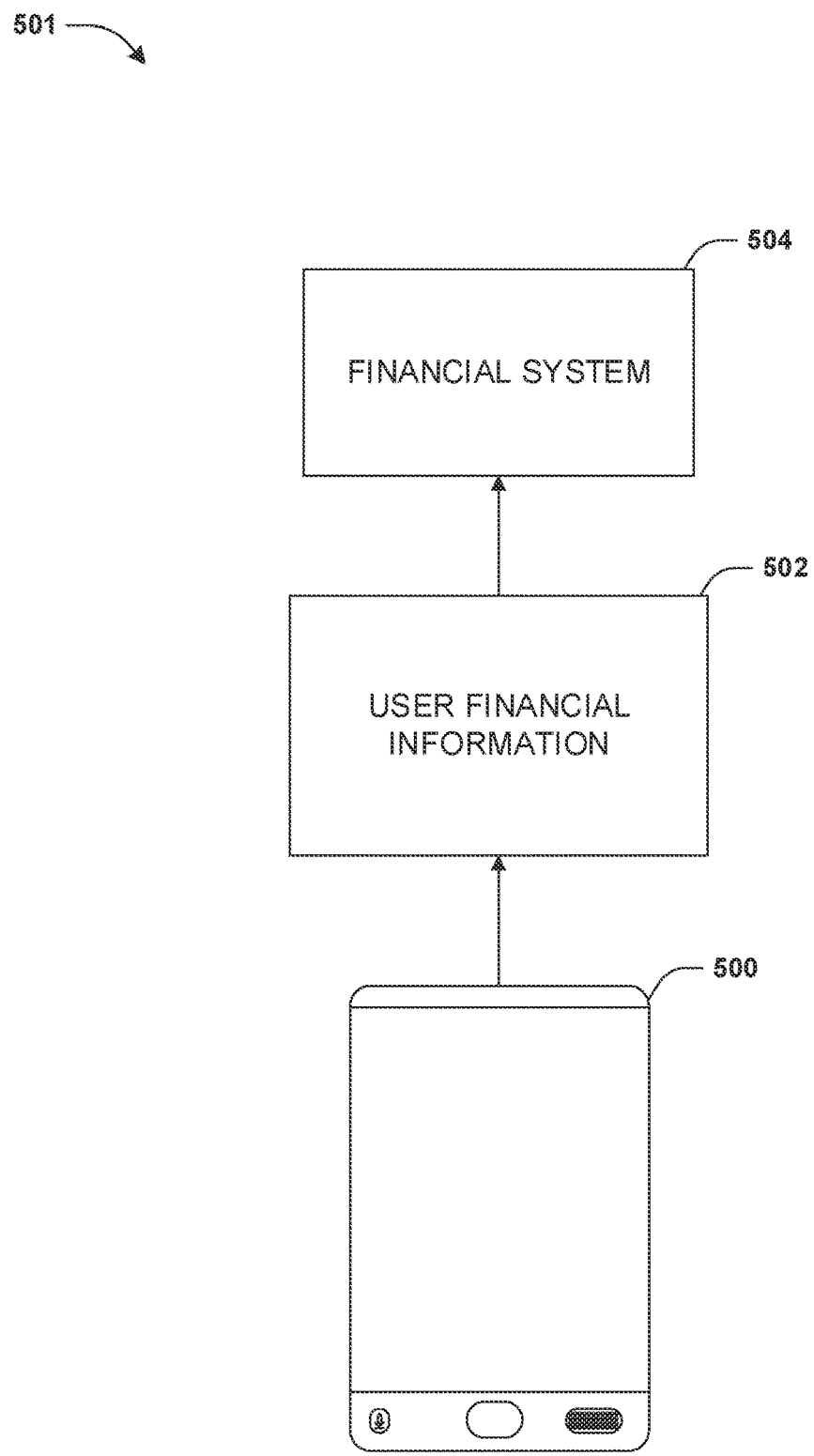
FIG. 5A is a diagram illustrating an exemplary system for determining financial return scores associated with payment options and/or selecting a payment option based upon the financial return scores, where a first client device transmits user financial information to a financial system.

In some examples, the financial account information may be determined using information received from the first client device (and/or a different client device associated with the first user account). For example, as shown in FIG. 5A, the first client device (shown with reference number 500) may transmit user financial information 502 to the financial system (shown with reference number 504). The user financial information 502 may be input (by the first user, for example) via a financial interface displayed via the first client device 500. The user financial information 502 may be indicative of at least some of the financial account information (and/or at least some of the financial account information may be determined based upon the user financial information 502).

Alternatively and/or additionally, the user financial information 502 may be indicative of identification information associated with the first user (e.g., a social security number and/or other identification information) and/or authorization for the financial system 504 to access financial information associated with the first user and/or at least some of the plurality of payment options (such as the first payment option). In an example, the identification information (and/or the authorization) may be used (by the financial system 504, for example) to access at least some of the financial account information associated with the plurality of payment options. For example, the identification information (and/or the authorization) may be used to access one or more reports (e.g., a credit report and/or one or more other types of reports) associated with the first user. For example, a request for a report of the one or more reports may be transmitted (by the financial system 504, for example) to a device (e.g., a credit bureau device). The request for the report may be indicative of the identification information and/or the authorization. The device may transmit the report to the financial system 504 based upon the request.

Figure 5B:
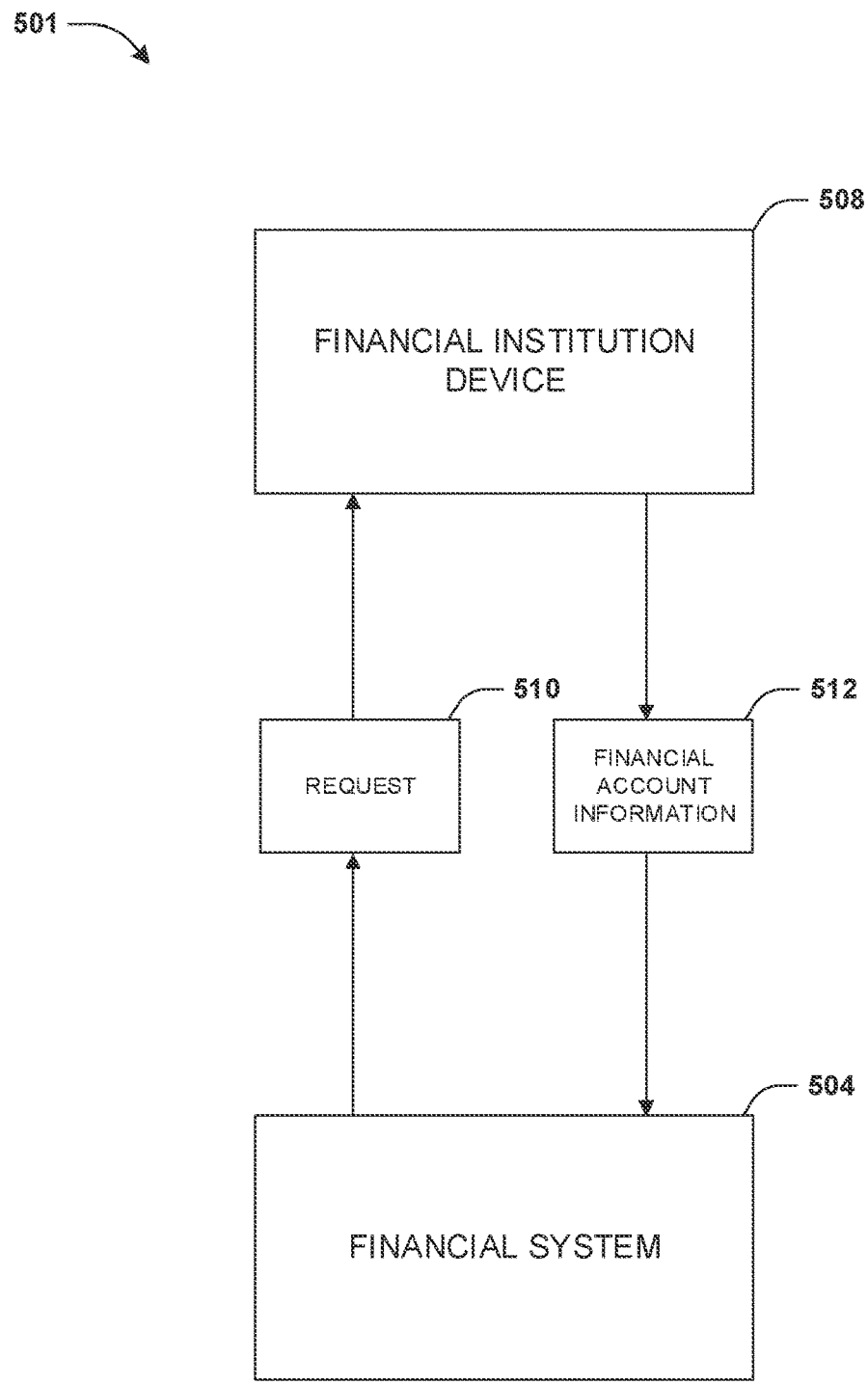
FIG. 5B is a diagram illustrating an exemplary system for determining financial return scores associated with payment options and/or selecting a payment option based upon the financial return scores, where a financial system transmits a request for financial information to a first financial institution device and/or receives information from the first financial institution device.

Alternatively and/or additionally, at least some of the financial account information associated with the plurality of payment options may be determined based upon information received from one or more financial institution devices associated with one or more payment options of the plurality of payment options. In an example with respect to determining the first financial account information associated with the first payment option, at least some of the first financial account information may be determined based upon information received from a first financial institution device associated with the first payment option. For example, as shown in FIG. 5B, the financial system 504 may transmit a request 510 for financial information to the first financial institution device (shown with reference number 508). The request 510 may be indicative of at least one of the identification information, at least some of the user financial information 502, etc. In response to receiving the request 510, the first financial institution device 508 may transmit information 512 to the financial system 504. At least some of the first financial account information associated with the first payment option may be determined based upon the information 512. In an example, the request 510 may comprise a request for at least one of promotion information, fee information, an interest rate, an APR, etc. associated with the first payment option. Alternatively and/or additionally, the information 512 may indicative of at least one of promotion information, fee information, an interest rate, an APR, etc. associated with the first payment option.

In some examples, the financial account information associated with the plurality of payment options may be updated (e.g., periodically updated, such as daily, weekly, monthly, etc.). For example, the financial account information may be updated (e.g., periodically updated) by transmitting (e.g., periodically transmitting) requests for information to one or more financial institution devices associated with one or more payment options of the plurality of payment options and/or receiving (e.g., periodically receiving) information from one or more financial institution devices associated with one or more payment options of the plurality of payment options. In an example with respect to updating the first financial account information associated with the first payment option, at least some of the first financial account information may be updated based upon information received from the first financial institution device 508 (and/or one or more other financial institution devices) associated with the first payment option. For example, the financial system 504 may transmit (e.g., periodically transmit) a request for financial information (e.g., current and/or updated financial information) associated with the first payment option to the first financial institution device 508 (and/or one or more other financial institution devices) associated with the first payment option. Alternatively and/or additionally, the financial system 504 may receive (e.g., periodically receive) a message comprising financial information (e.g., current and/or updated financial information) associated with the first payment option from the first financial institution device 508 (and/or one or more other financial institution devices) associated with the first payment option (e.g., the first financial institution device 508 and/or one or more other financial institution devices associated with the first payment option may transmit a message comprising financial information associated with the first payment option to the financial system 504 in response to receiving a request from the financial system 504). In response to receiving a message comprising financial information (e.g., current and/or updated financial information) associated with the first payment option, the first financial account information may be updated (by the financial system 504, for example) based upon the message. In an example, at least one of the account balance, the credit card balance, the credit limit, the interest rate, the APR, etc. indicated by the first financial account information may be updated based upon at least one of an updated account balance, an updated credit card balance, an updated credit limit, an updated interest rate, an updated APR, etc. indicated by the message. Alternatively and/or additionally, the first currency profile may be updated based upon at least one of updated promotion information, updated fee information, etc. indicated by the message.

Alternatively and/or additionally, at least some of the financial account information associated with the plurality of payment options may be determined and/or updated based upon messages associated with the first user and/or the first user account. In an example, messages associated with the first user and/or the first user account may be analyzed to identify one or more messages associated with one or more payment options of the plurality of payment options, wherein at least some of the financial account information may be determined and/or updated based upon the one or more messages. In some examples, the messages may comprise at least one of emails of a first email account, instant messages of a first instant messaging account, text messages, etc. In some examples, the messages may be accessed and/or analyzed (by the financial system 504, for example) in response to (and/or based upon) receiving authorization, from the first client device 500 (and/or one or more other client devices associated with the first user account), to access and/or analyze at least one of emails received and/or sent by the first email account, messages received and/or sent by the first instant messaging account, text messages received and/or sent by the first client device 500, etc.

In an example with respect to determining and/or updating the first financial account information associated with the first payment option, at least some of the first financial account information may be determined and/or updated based upon one or more messages associated with the first user and/or the first user account. In an example, messages associated with the first user and/or the first user account may be analyzed to identify one or more first messages associated with the first payment option. In an example, the one or more first messages may comprise at least one of one or more emails of the first email account, one or more instant messages of the first instant messaging account, one or more text messages received and/or sent by the first client device 500, etc. In an example, at least one of the account balance, the credit card balance, the credit limit, the interest rate, the APR, etc. indicated by the first financial account information may be determined and/or updated based upon at least one of an updated account balance, an updated credit card balance, an updated credit limit, an updated interest rate, an updated APR, etc. indicated by the one or more first messages. Alternatively and/or additionally, the first currency profile may be determined and/or updated based upon at least one of promotion information, fee information, etc. indicated by the one or more first messages.

In an example, the first currency profile may comprise promotion information associated with one or more first promotions of the first payment option. In an example, the one or more first promotions may correspond to one or more programs (e.g., incentive programs) and/or one or more contracts operated by the first financial institution to encourage use of the first payment option, such as by providing the first user with rewards (e.g., a gain based upon a transaction, such as at least one of points, frequent flyer miles, a monetary amount such as cashback, etc.), in accordance with the one or more first promotions. The one or more first messages may comprise one or more promotion messages associated with the first payment option. A promotion message of the one or more promotion messages may be indicative of information (e.g., a policy) associated with a promotion of the one or more first promotions. The promotion information of the first currency profile may be determined and/or updated based upon the promotion. Alternatively and/or additionally, in an example in which a promotion message of the one or more promotion messages is indicative of a promotion that is not activated for the first payment option (where the promotion message is a promotion activation message associated with activating the promotion, for example), the promotion may be activated (automatically and/or without manual user input, for example) using the promotion message (e.g., the promotion may be automatically activated by the financial system 504). In some examples, at least one of first promotion information of the first currency profile may be associated with a first promotion of the one or more first promotions, second promotion information of the first currency profile may be associated with a second promotion of the one or more first promotions, etc. In an example, the first promotion information may be indicative of at least one of a start date of the first promotion, an end date (e.g., expiration date) of the first promotion, a transaction reward specification (e.g., an amount and/or unit of rewards provided for a transaction), one or more transaction categories to which the first promotion applies, one or more limitations of the first promotion (e.g., at least one of a limit to an amount of rewards provided to the first user using the first promotion, a limit to an amount of spend for which the first promotion can be applied, etc.), etc.

In some examples, the financial account information associated with the plurality of payment options may comprise valuation information associated with promotions (and/or rewards) of the plurality of payment options. In some examples, the valuation information may be used to determine a value (e.g., monetary value) of rewards associated with a promotion of a payment option of the plurality of payment options. In some examples, at least some of the valuation information may be determined based upon information received from one or more valuation provider devices. In an example, a valuation provider device may be associated with a valuation provider that provides information indicating value of rewards of a financial institution. For example, first valuation information of the first financial account information associated with the first payment option may be associated with the one or more first promotions associated with the first payment option. In an example, the first valuation information may be included in the first currency profile of the first financial account information.

Figure 5C:
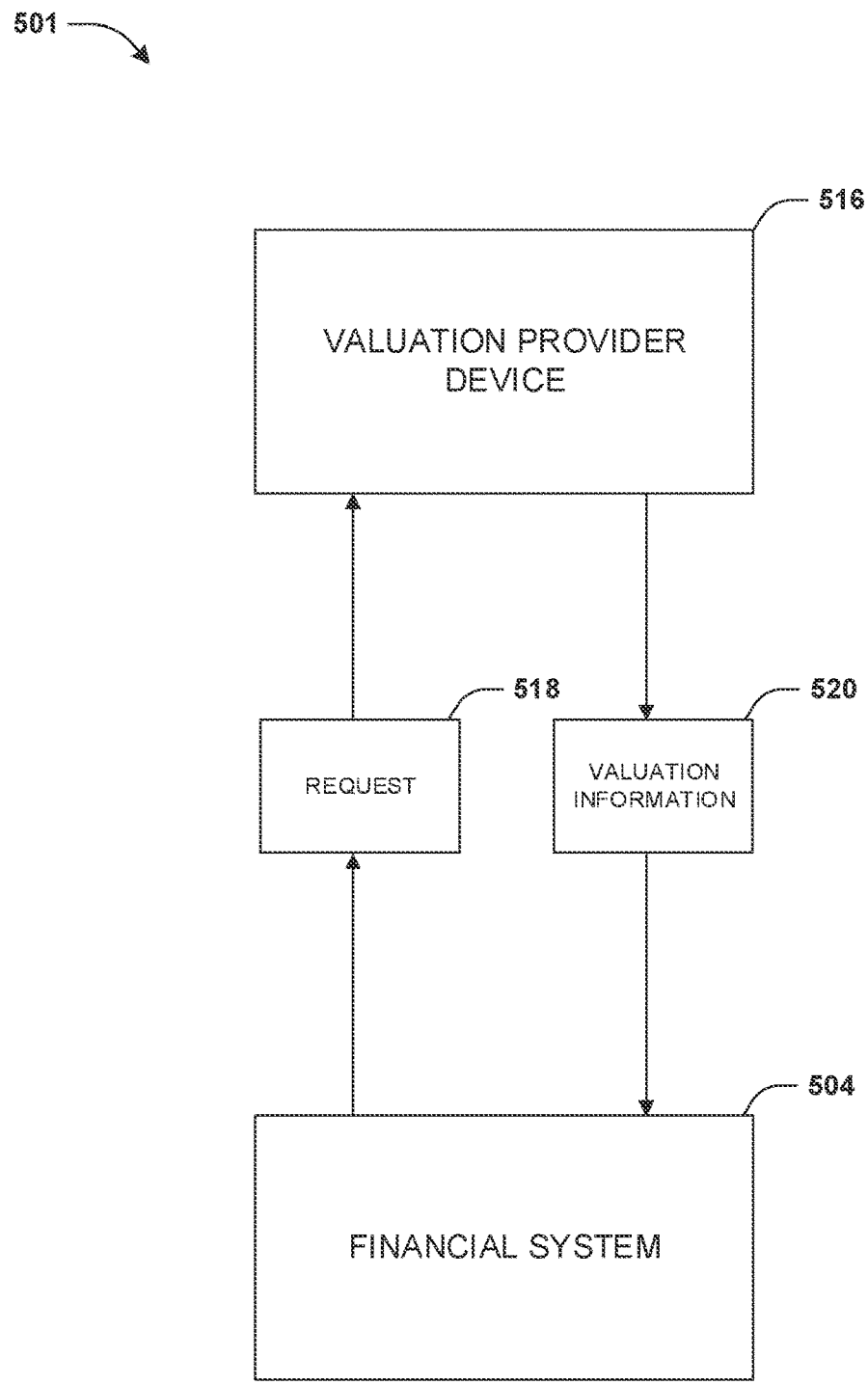
FIG. 5C is a diagram illustrating an exemplary system for determining financial return scores associated with payment options and/or selecting a payment option based upon the financial return scores, where a financial system transmits a request for valuation information to a valuation provider device and/or receives information from the valuation provider device.

FIG. 5C illustrates the first valuation information associated with the one or more first promotions being determined and/or updated. In an example, the financial system 504 may transmit a request 518 for valuation information to a valuation provider device 516. The request 518 may be indicative of information comprising at least one of the first payment option, the first financial institution, the one or more first promotions, etc., wherein the information may be used by the valuation provider device 516 to identify the one or more first promotions and/or rewards for which valuation information is requested. In response to receiving the request 518, the valuation provider device 516 may transmit valuation information 520 to the financial system 504. In some examples, the first valuation information may be determined and/or updated based upon the valuation information 520. In an example, the first valuation information may be indicative of a value (e.g., a monetary value) of a reward of a promotion of the one or more first promotions (e.g., the first valuation information may be indicative of an exchange rate between a reward of a promotion of the one or more first promotions and a value, such as a monetary value). In an example in which the promotion is associated with providing points to the first user in response to transactions performed using the first payment option, the value may correspond to a value (e.g., a monetary value) of the points. Accordingly, using the first valuation information, a value (e.g., a monetary value) of rewards provided in accordance with the promotion may be determined (by the financial system 504, for example). In some examples, the first valuation information may be updated (e.g., periodically updated, such as daily, weekly, monthly, etc.). For example, the first valuation information may be updated (e.g., periodically updated) by transmitting (e.g., periodically transmitting) requests to the valuation provider device 516 (and/or one or more other valuation provider devices) and/or receiving (e.g., periodically receiving) valuation information associated with promotions associated with the first payment option from the valuation provider device 516 (and/or one or more other valuation provider devices).

In some examples, the financial interface may display (and/or provide access to) information associated with the plurality of payment options, such as at least some of the financial account information associated with the plurality of payment options. In an example, for each payment option of at least some of the plurality of payment options, the financial interface may display (and/or provide access to) at least one of information associated with a financial account of the payment option, an account type of the payment option and/or the financial account, an account balance associated with the payment option, a credit card balance associated with the payment option, a credit limit associated with the payment option, an interest rate associated with the payment option, an APR of the financial account, a currency profile associated with the payment option, information associated with one or more promotions associated with the payment option, information associated with one or more fees associated with the payment option, rewards balances associated with the payment option, end dates of promotions associated with the payment option, etc. Alternatively and/or additionally, the financial interface may display (and/or provide access to) information associated with other payment options associated with one or more different users and/or one or more different user accounts (other than the first user and/or the first user account), such as based upon a determination that the one or more different users and/or the one or more different user accounts are part of a household and/or based upon a determination that the first user and/or the first user account have authorization to access the information associated with the one or more different users and/or the one or more different user accounts. In some examples, information that the financial interface displays (and/or provides access to) may be updated (e.g., periodically updated). For example, the information may be updated to include a promotion associated with a payment option in response to determining that the promotion is activated. Alternatively and/or additionally, the information may be updated to remove a promotion associated with a payment option in response to determining that the promotion is expired and/or deactivated (and/or the information may be updated to indicate that the promotion is deactivated in response to determining that the promotion is expired and/or deactivated). Alternatively and/or additionally, at least one of an account balance, a credit card balance, an APR, a rewards balance, etc. may be updated in response to detecting a change to at least one of the account balance, the credit card balance, the APR, the rewards balance, etc.

In some examples, notifications associated with the plurality of payment options may be transmitted to the first client device 500 and/or presented via the first client device 500 (such as via at least one of a text message, the financial interface, etc.). In an example, a notification indicative of the end date of the first promotion may transmitted to the first client device 500 and/or presented via the first client device 500 (e.g., the notification may be transmitted and/or presented in response to a determination that a duration of time until the end date is less than a threshold duration of time).

Alternatively and/or additionally, a notification indicative of an expiration date of rewards (e.g., received as a result of using a payment option to perform a transaction) may be transmitted to the first client device 500 and/or presented via the first client device 500 (e.g., the notification may be transmitted and/or presented in response to a determination that a duration of time until the expiration date is less than a threshold duration of time).

Alternatively and/or additionally, a notification indicative of a suggested payment option may be transmitted to the first client device 500 and/or presented via the first client device 500. For example, the notification may indicate that the first user may benefit from applying for and/or establishing the suggested payment option and/or a financial account associated with the suggested payment option. In some examples, the notification may be transmitted and/or presented in response to a determination that a value (e.g., a value of rewards) gained by the first user as a result of historical transactions performed using one or more payment options of the plurality of payment options is less than a value that the first user would have gained if the historical transactions were performed using the suggested payment option. In an example, the determination may be based upon historical transaction information associated with the first user and/or the first user account. The historical transaction information may be indicative of transactions performed (using the financial system 504, for example) using payment options of the plurality of payment options (e.g., the historical transaction information may be included in the financial account information associated with the plurality of payment options).

At 404, a transaction-related request associated with a first transaction associated with the first user account may be received. In some examples, the transaction-related request may be received from the first client device 500 (and/or a different client device associated with the first user and/or the first user account). Alternatively and/or additionally, the transaction-related request may be received from a payment system (e.g., a system configured to perform and/or facilitate the first transaction). The transaction-related request may be a request to select a payment option of the plurality of payment options for the first transaction. Alternatively and/or additionally, the transaction-related request may be a request to perform the first transaction using a payment option (selected by the financial system 504, for example) of the plurality of payment options. In some examples, the first transaction may correspond to a purchase (by the first user, for example) of one or more products and/or one or more services. In an example, the first transaction may correspond to at least one of a shopping transaction (e.g., a transaction using an online shopping service and/or a transaction at a physical location, such as a store), a business-to-business (B2B) transaction, a consumer-to-consumer (C2C) transaction, a transaction for purchasing one or more services, a transaction performed using an internet resource (e.g., an e-commerce internet resource) such as an internet resource associated with an e-commerce service (e.g., at least one of an online shopping service, an online marketplace, a business-to-business (B2B) buying and/or selling service, etc.), etc.

In some examples, first transaction information associated with the first transaction may be determined (in response to receiving the transaction-related request, for example). In some examples, the first transaction information may be indicative of one or more first transaction categories associated with the first transaction. For example, a transaction category of the one or more first transaction categories may correspond to at least one of an entity category of a first entity (e.g., a company, a business, an organization, etc.) with which the first transaction is to be performed (e.g., the entity category may correspond to at least one of a seller of a product and/or service to be purchased via the first transaction, a gas station, an online shopping service, a physical store, a restaurant, a grocery shopping service such as a physical grocery store and/or an online grocery shopping service, a department store, a nonprofit, etc.), an item category of one or more items to be purchased via the first transaction (e.g., the item category may correspond to at least one of groceries, household products, electrical appliances, cars, etc.), a service category of one or more services to be purchased via the first transaction (e.g., the service category may correspond to at least one of catering services, advertising services, restaurant service, etc.), etc. In some examples, the one or more first transaction categories may be determined based upon the transaction-related request. For example, the transaction-related request may be indicative of information associated with the first transaction, such as at least one of the first entity with which the first transaction is to be performed, one or more items to be purchased via the first transaction, one or more services to be purchased via the first transaction, an internet resource (e.g., an e-commerce internet resource, such as a shopping website) with which the first transaction is to be performed, etc. In some examples, the first entity may be determined based upon the internet resource. For example, a database of entity information indicative of internet resources associated with entities may be analyzed based upon the internet resource and/or a domain of the internet resource to identify the first entity (e.g., it may be determined that the internet resource and/or the domain are associated with, such as owned and/or used by, the first entity). The one or more first transactions categories may be determined based upon the information indicated by the transaction-related request. In some examples, such as in an example in which the first transaction is performed at a physical location (e.g., a store, a restaurant, etc.), a transaction category of the one or more first transaction categories may be determined by determining a location of the first client device 500 and/or determining that the location is within an area (e.g., a building, a store, a restaurant, etc.) that at least one of sells items corresponding to the transaction category, is associated with an entity corresponding to the transaction category, etc.

Alternatively and/or additionally, the first entity may be determined based upon the location of the first client device 500, such as based upon a determination that the area in which the first client device 500 is located is associated with the first entity. In some examples, the area in which the first client device 500 is located may be identified by comparing the location of the first client device 500 with a polygon (indicative of geographical boundaries of the area, for example) to determine that the location is within the polygon. For example, a database of polygons associated with areas (e.g., buildings, stores, restaurants, etc.) may be analyzed to identify the area within which the first client device 500 is located.

Alternatively and/or additionally, the first transaction information associated with the first transaction may comprise a first transaction amount associated with the first transaction (e.g., a total value of the first transaction), such as an amount of currency to be paid to complete the first transaction. Alternatively and/or additionally, the first transaction information associated with the first transaction may be indicative of the first entity with which the transaction is to be performed. Alternatively and/or additionally, the first transaction information associated with the first transaction may be indicative of one or more items selected (by the first user, for example) for purchase via the first transaction.

Figure 5D:
FIG. 5D is a diagram illustrating an exemplary system for determining financial return scores associated with payment options and/or selecting a payment option based upon the financial return scores, where a transaction interface is displayed via a first client device.

FIG. 5D illustrates a transaction interface 534 being displayed via the first client device 500. In some examples, the transaction interface 534 may correspond to at least one of an application (e.g., a mobile application), a webpage, a browser plugin, etc. provided and/or controlled by the financial system 504 and/or the first client device 500. In some examples, the transaction interface 534 may display a list 526 (e.g., a shopping list, such as a shopping cart) indicative of one or more items selected (by the first user, for example) for purchase via the first transaction. In some examples, the list 526 may comprise indications of the one or more items, one or more prices of the one or more items, and/or the first transaction amount (e.g., "Total $20.00") associated with the first transaction. In some examples, the one or more items, the one or more prices and/or the first transaction amount may be manually input via the first client device 100. Alternatively and/or additionally, an item of the one or more items may be identified based upon a first image of the item and/or a second image of an identification label (e.g., a barcode) of the item (e.g., the first image and/or the second image may be captured using a camera of the first client device 500). Alternatively and/or additionally, the one or more items, the one or more prices and/or the first transaction amount may be determined based upon the list 526. Alternatively and/or additionally, at least one of the one or more items, the one or more prices and/or the first transaction amount may be received from a device, such as at least one of a device (e.g., a server) of an internet resource associated with an e-commerce service with which the first transaction is to be performed, a device at a physical location (e.g., a store, a restaurant, etc.) at which the first user and/or the first client device 500 are located (to perform the first transaction, for example), the first client device 500, etc. In some examples, the transaction interface 534 may comprise a selectable input 532 associated with performing the first transaction. In some examples, the transaction-related request may be transmitted by the first client device 500 in response to a selection of the selectable input 532.

At 406, a plurality of financial return scores associated with a second plurality of payment options may be determined based upon information, of the financial account information, associated with the second plurality of payment options and based upon the first transaction information associated with the first transaction. In some examples, the plurality of financial return scores associated with the second plurality of payment options may be determined in response to receiving the transaction-related request (and/or in response to the selection of the selectable input 532).

In some examples, the second plurality of payment options (for which the plurality of financial return scores are determined, for example) may comprise payment options of the plurality of payment options that are determined to be qualified for the first transaction and/or may not comprise payment options of the plurality of payment options that are determined to not be qualified for the first transaction. In some examples, the second plurality of payment options may be selected from the plurality of payment options associated with the first user account and/or the first user based upon a determination that each payment option of the second plurality of payment options is qualified for the first transaction.

In an example, whether the first payment option is qualified for the first transaction may be determined based upon the account balance, the credit card balance and/or the credit limit indicated by the first financial account information associated with the first payment option. In an example, an amount of available spend using the first payment option may be determined based upon the account balance, the credit card balance and/or the credit limit, and/or the amount of available spend may be compared with the first transaction amount of the first transaction. In an example, the amount of available spend may correspond to the account balance (e.g., the account balance may be indicative of an amount of currency in the first financial account associated with the first payment option. In an example, the amount of available spend may correspond to a difference between the credit limit and the credit card balance.

In some examples, the first payment option may be determined to not be qualified for the first transaction based upon a determination that the amount of available spend is less than the first transaction amount. For example, the first payment option of the plurality of payment options may not be included in the second plurality of payment options (and/or a financial return score, of the plurality of financial return scores, associated with the first payment option may not be determined) based upon a determination that the first payment option is not qualified for the first transaction.

Alternatively and/or additionally, the first payment option may be determined to be qualified for the first transaction based upon a determination that the amount of available spend is exceeds the first transaction amount. For example, the first payment option of the plurality of payment options may be included in the second plurality of payment options (and/or a first financial return score, of the plurality of financial return scores, associated with the first payment option may be determined) based upon a determination that the first payment option is qualified for the first transaction.

In some examples, the plurality of financial return scores may be may be determined based upon currency profiles associated with the second plurality of payment options, valuation information associated with the second plurality of payment options and/or the first transaction information associated with the first transaction. In some examples, for each payment option of the second plurality of payment options, a value (e.g., a monetary value) may be determined and/or a financial return score may be determined based upon the value.

Figure 5E:
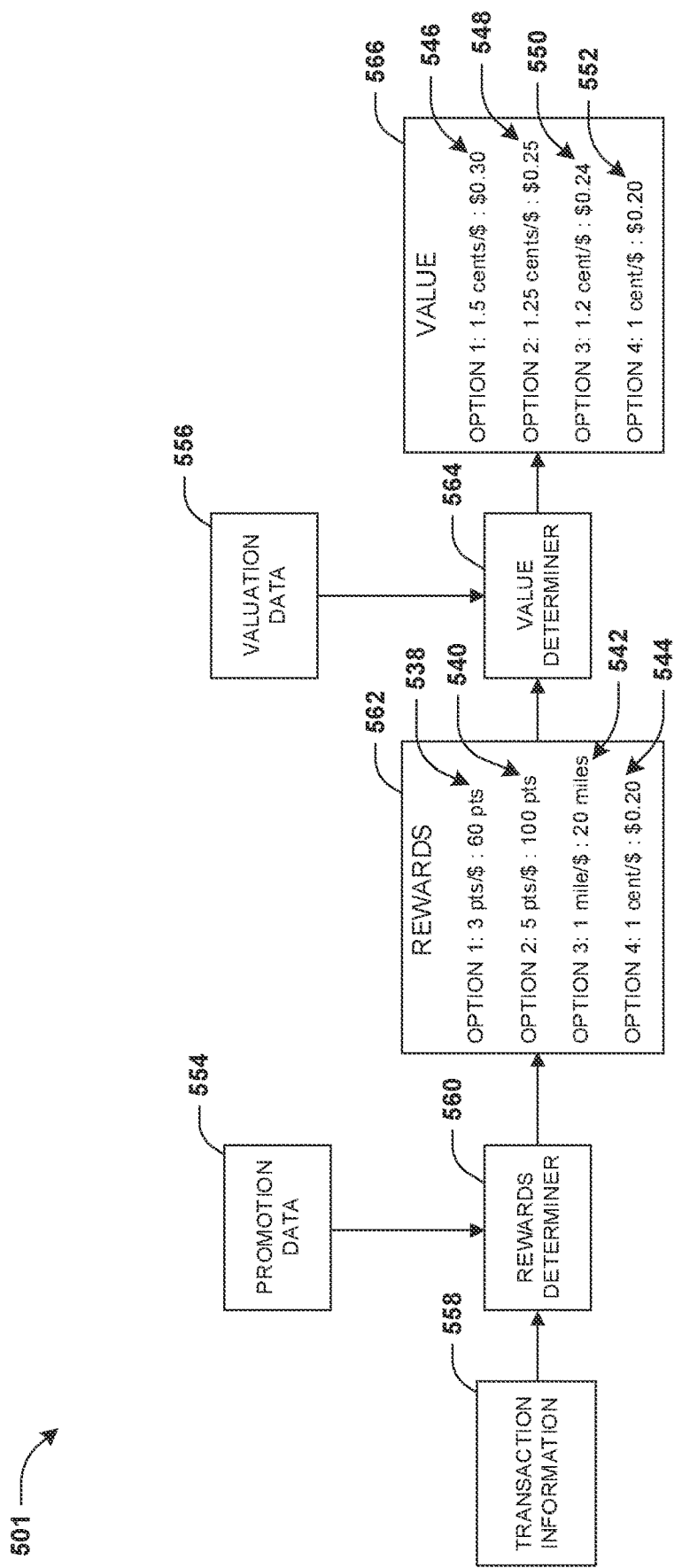
FIG. 5E is a diagram illustrating an exemplary system for determining financial return scores associated with payment options and/or selecting a payment option based upon the financial return scores, where values associated with payment options are determined.

FIG. 5E illustrates values 566 associated with payment options of the second plurality of payment options being determined. In some examples, measures of rewards 562 may be determined based upon promotion data 554 and/or the first transaction information (shown with reference number 558). For example, the measures of rewards 562 may be determined by a rewards determiner 560. In some examples, the measures of rewards 562 may comprise a first measure of rewards 538 associated with the first payment option (e.g., "OPTION 1") of the second plurality of payment options, a second measure of rewards 540 associated with the second payment option (e.g., "OPTION 2") of the second plurality of payment options, a third measure of rewards 542 associated with a third payment option (e.g., "OPTION 3") of the second plurality of payment options and/or a fourth measure of rewards 544 associated with a fourth payment option (e.g., "OPTION 4") of the second plurality of payment options.

In some examples, the promotion data 554 may comprise promotion information of currency profiles, of the financial account information, associated with the second plurality of payment options. For example, the promotion data 554 may comprise one or more first sets of promotion information (of the first currency profile) associated with the one or more first promotions of the first payment option, one or more second sets of promotion information (of a second currency profile of the second financial account information associated with the second payment option) associated with one or more second promotions of the second payment option, one or more third sets of promotion information (of a third currency profile of third financial account information associated with the third payment option) associated with one or more third promotions of the third payment option, and/or one or more fourth sets of promotion information (of a fourth currency profile of fourth financial account information associated with the fourth payment option) associated with one or more fourth promotions of the fourth payment option.

In some examples, the first measure of rewards 538 may be determined based upon one or more applicable promotions, of the one or more first promotions, that are applicable to the first transaction. In an example, the one or more applicable promotions may be determined based upon one or more transaction categories associated with the one or more first promotions. For example, a first promotion of the one or more first promotions may be determined to be applicable to the first transaction (and/or may be included in the one or more applicable promotions) based upon a determination that the first promotion is applicable to all transaction categories. Alternatively and/or additionally, a second promotion of the one or more first promotions may be determined to be applicable to the first transaction (and/or may be included in the one or more applicable promotions) based upon a determination that the second promotion is applicable to a transaction category of the one or more first transaction categories (indicated by the first transaction information 558). Alternatively and/or additionally, a third promotion of the one or more first promotions may be determined to not be applicable to the first transaction (and/or may not be included in the one or more applicable promotions) based upon a determination that the third promotion is not applicable to a transaction category (e.g., any transaction category) of the one or more first transaction categories. The first measure of rewards 538 may be determined based upon rewards associated with the one or more applicable promotions (e.g., rewards associated with promotions of the one or more first promotions that are not included in the one or more applicable promotions may not be used to determine the first measure of rewards 538).

In an example, the first measure of rewards 538 may comprise a rewards rate (e.g., an amount of rewards per unit) associated with using the first payment option to perform the first transaction. In an example shown in FIG. 5E, the rewards rate is 3 points per unit of currency of the first transaction. Alternatively and/or additionally, the first measure of rewards 538 may comprise a total amount of rewards associated with using the first payment option to perform the first transaction. In an example shown in FIG. 5E, the total amount of rewards is 60 points. For example, the total amount of rewards may be determined based upon the first transaction amount (e.g., $20.00) and the rewards rate (e.g., 3 points per unit of currency, such as 3 points per dollar). For example, the total amount of rewards may be equal to the first transaction amount multiplied by the rewards rate. In an example in which the one or more applicable promotions comprise the first promotion and the second promotion, the first measure of rewards 538 may be determined based upon a first transaction reward specification associated with the first promotion and/or a second transaction reward specification associated with the second promotion. For example, the first transaction reward specification may be indicative of a first rewards rate associated with the first promotion (e.g., 2 points per unit of currency) and/or the second transaction reward specification may be indicative of a second rewards rate associated with the second promotion (e.g., 1 point per unit of currency). The rewards rate of the first measure of rewards 538 may be determined based upon the first rewards rate and the second rewards rate. For example, one or more operations (e.g., mathematical operations) may be performed using the first rewards rate and the second rewards rate to determine the rewards rate of the first measure of rewards 538 (e.g., the rewards rate of the first measure of rewards 538 may be the sum of the first rewards rate and the second rewards rate).

Alternatively and/or additionally, the first measure of rewards 538 may be determined based upon one or more limitations of the first promotion and/or the second promotion. For example, the one or more limitations may comprise a first rewards limitation (e.g., a maximum amount of rewards provided as a result of transactions using the first promotion) associated with the first promotion and/or a second rewards limitation (e.g., a maximum amount of rewards provided as a result of transactions using the second promotion) associated with the second promotion. In an example, a first amount of available rewards associated with the first promotion may be determined. For example, the first amount of available rewards may be determined based upon the first rewards limitation and a first amount of provided rewards associated with the first promotion (e.g., the first amount of provided rewards may correspond to an amount of rewards provided to the first user and/or the first financial account in accordance with the first promotion as a result of transactions performed using the first payment option). The first amount of available rewards may correspond to a difference between the first rewards limitation and the first amount of provided rewards. In some examples, rewards provided in accordance with the first promotion based upon the first transaction may not exceed (and/or may be limited to) the first amount of available rewards. Alternatively and/or additionally, a second amount of available rewards associated with the second promotion may be determined based upon the second rewards limitation and/or a second amount of provided rewards associated with the second promotion. Rewards provided in accordance with the second promotion based upon the first transaction may not exceed (and/or may be limited to) the second amount of available rewards. Alternatively and/or additionally, if rewards are transferable between the first financial account and a different financial account (other than the first financial account), the first amount of available rewards and/or the second amount of available rewards may be increased based upon an amount of available rewards of the different financial account. In some examples, whether rewards are transferable between the first financial account and a different financial account may be determined based upon information received from the first client device 500 and/or a client device associated with the different financial account.

In some examples, other measures of rewards (other than the first measure of rewards 538) of the measures of rewards 562 may be determined using one or more of the techniques provided herein with respect to determining the first measure of rewards 538.

In some examples, the values 566 associated with payment options of the second plurality of payment options may be determined based upon valuation data 556 and/or the measures of rewards 562. For example, the values 566 may be determined by a value determiner 564. In some examples, the values 566 may comprise a first value 546 (e.g., a first monetary value) associated with the first payment option (e.g., "OPTION 1"), a second value 548 (e.g., a second monetary value) associated with the second payment option (e.g., "OPTION 2"), a third value 550 (e.g., a third monetary value) associated with the third payment option (e.g., "OPTION 3") and/or a fourth value 552 (e.g., a fourth monetary value) associated with the fourth payment option (e.g., "OPTION 4"). In some examples, each value of the values 566 may have the same unit of measure (e.g., the values 566 may each be in units of the same currency). For example, a value of the values 566 may correspond to a value, in units of the same currency, of rewards received as a result of performing the first transaction using a payment option of the second plurality of payment options. For example, whereas measures of rewards of the measures of rewards 562 may have different units of measure (e.g., different units of currency, such as where the first measure of rewards 538 is in units of points and the third measure of rewards 542 is in units of miles, and/or where points of the first measure of rewards 538 have a different value than points of the second measure of rewards 540), the values 566 may have the same unit of measure (e.g., the values 566 may be in units of the same currency).

In some examples, the valuation data 556 may comprise valuation information, of the financial account information, associated with applicable promotions (e.g., promotions applicable to the first transaction) of the second plurality of payment options. In an example, the valuation data 556 may comprise the first valuation information associated with rewards of the first payment option (e.g., "OPTION 1"), second valuation information associated with rewards of the second payment option (e.g., "OPTION 2"), third valuation information associated with rewards of the third payment option (e.g., "OPTION 3") and/or fourth valuation information associated with rewards of the fourth payment option (e.g., "OPTION 4").

In an example, the first value 546 may be determined based upon the first valuation information associated with rewards of the first payment option (e.g., "OPTION 1") and/or the first measure of rewards 538. The first value 546 may comprise a value rate (e.g., an amount of value per unit). In an example shown in FIG. 5E, the value rate is 1.5 cents per unit of currency of the first transaction (e.g., 1.5 cents per dollar). Alternatively and/or additionally, the first value 546 may comprise a total value associated with using the first payment option to perform the first transaction. In an example shown in FIG. 5E, the total value is $0.30 (e.g., the value of rewards provided to the first user and/or the first financial account as a result of performing the first transaction using the first payment option may be $0.30). In an example, the first valuation information may be indicative of a first reward value of a reward of the first promotion and/or a second reward value of a reward of the second promotion (e.g., the first reward value and/or the second reward value may be provided by the valuation provider device 516 and/or a different valuation provider device). In some examples, the first value 546 may be determined based upon the first reward value and/or the second reward value.

In an example in which the first reward value and the second reward value are equal to a third reward value (e.g., rewards provided in accordance with both the first promotion and the second promotion have the same value, such as where a point provided in accordance with the first promotion and a point provided in accordance with the second promotion are worth the same amount), the first value 546 may be determined by combining (e.g., multiplying) the third reward value by the first measure of rewards 538. In an example in which the first reward value and the second reward value are equal to 0.5 cents per point, the value rate may be determined to be 1.5 cents per unit of currency (e.g., 0.5 cents per point multiplied by 3 points per unit of currency equals 1.5 cents per unit of currency). Alternatively and/or additionally, if the first reward value and the second reward value are equal to 0.5 cents per point, the total value may be determined to be $0.30 (e.g., 0.5 cents per point multiplied by 60 points equals 30 cents). In some examples, such as in an example in which the first reward value associated with the first promotion is different than the second reward value associated with the second promotion, the first value 546 may be determined based upon the first reward value, the first rewards rate associated with the first promotion, the second reward value and/or the second rewards rate associated with the second promotion.

In some examples, other values (other than the first value 546) of the values 566 may be determined using one or more of the techniques provided herein with respect to determining the first value 546. In an example, based upon the second measure of rewards 540 indicating a rewards rate of 5 points per unit of currency and/or a total amount of rewards of 100 points, and/or based upon the second valuation information indicating a reward value of 0.25 cents per point associated with rewards associated with one or more promotions of the second payment option (e.g., "OPTION 2"), the second value 548 associated with the second payment option (e.g., "OPTION 2") may be determined to be a value rate of 1.25 cents per unit of currency and/or a total value of $0.25. In an example, based upon the third measure of rewards 542 indicating a rewards rate of 1 mile per unit of currency and/or a total amount of rewards of 20 miles, and/or based upon the third valuation information indicating a reward value of 1.2 cents per mile associated with rewards associated with one or more promotions of the third payment option (e.g., "OPTION 3"), the third value 550 associated with the third payment option (e.g., "OPTION 3") may be determined to be a value rate of 1.2 cents per unit of currency and/or a total value of $0.24. In an example, based upon the fourth measure of rewards 544 indicating a rewards rate of 1 cent per unit of currency (e.g., 1 percent cashback) and/or a total amount of rewards of $0.20, the fourth value 552 associated with the fourth payment option (e.g., "OPTION 4") may be determined to be a value rate of 1 cent per unit of currency and/or a total value of $0.20 (e.g., the value rate may be the same as the rewards rate and/or the total value may be the same as the total amount of rewards).

In some examples, the plurality of financial return scores may be determined based upon the values 566. In an example, one, some and/or all financial return scores of the plurality of financial return scores may be equal to corresponding values of the values 566 (e.g., at least one of the first financial return score associated with the first payment option may be equal to the first value 546 associated with the first payment option, a second financial return score associated with the second payment option may be equal to the second value 548 associated with the second payment option, etc.).

Alternatively and/or additionally, the plurality of financial return scores may be determined based upon one or more user preferences associated with the first user and/or the first user account. For example, the one or more user preferences may be received via the first client device 500 (and/or a different client device associated with the first user account). For example, the one or more user preferences may be received via the financial interface associated with the financial system 504. One or more weights associated with one or more reward types (e.g., at least one of points, miles, cashback, etc.) may be determined based upon the one or more user preferences. In an example, the one or more weights may comprise a first weight associated with a first reward type (e.g., points), a second weight associated with a second reward type (e.g., miles) and/or a third weight associated with a third reward type (e.g., cashback). The first weight may be applied to determine a financial return score associated with a payment option associated with an applicable promotion associated with providing rewards of the first reward type. In an example shown in FIG. 5E in which rewards associated with the first payment option and the second payment option are of the first reward type (e.g., points), the first weight may be applied to determine the first financial return score and/or the second financial return score. The second weight may be applied to determine a financial return score associated with a payment option associated with an applicable promotion associated with providing rewards of the second reward type. In an example shown in FIG. 5E in which rewards associated with the third payment option are of the second reward type (e.g., miles), the second weight may be applied to determine a third financial return score associated with the third payment option. The third weight may be applied to determine a financial return score associated with a payment option associated with an applicable promotion associated with providing rewards of the third reward type. In an example shown in FIG. 5E in which rewards associated with the fourth payment option are of the third reward type (e.g., cashback), the third weight may be applied to determine a fourth financial return score associated with the fourth payment option. In an example, the one or more user preferences may indicate a preference of the first reward type over the second reward type (e.g., the first user prefers gaining points over miles). Based upon the preference, the first weight may be higher than the second weight (and/or an increase of the first financial return score as a result of application of the first weight to determine the first financial return score may be greater than an increase of the third financial return score based upon application of the second weight to determine the third financial return score). In some examples, application of a weight of the one or more weights to determine a financial return score may comprise using the weight to determine the financial return score. In an example, the first financial return score associated with the first payment option may be determined based upon the first value 546 and/or the first weight.

Alternatively and/or additionally, the plurality of financial return scores may be determined based upon at least one of transaction fees, interest rates, APRs, etc. associated with the second plurality of payment options. In an example, a lower transaction fee associated with the first payment option may correspond to a higher score of the first financial return score (e.g., the total value of the first value 546 may be reduced by the transaction fee to determine the first financial return score). Alternatively and/or additionally, a lower interest rate associated with the first payment option may correspond to a higher score of the first financial return score. Alternatively and/or additionally, a lower APR associated with the first payment option may correspond to a higher score of the first financial return score.

At 408, the first payment option of the second plurality of payment options may be selected for the first transaction based upon the plurality of financial return scores. In some examples, the first payment option may be selected based upon a determination that the first financial return score associate with the first payment option is a highest financial return score of the plurality of financial return scores. In some examples, such as in an example in which each financial return score of the plurality of financial return scores is equal to a corresponding value of the values 566, the selected payment option (e.g., the first payment option) may be a payment option with the highest value among the values 566 (and thus a payment option with the maximum financial gain for the first user, for example). In some examples, such as in an example in which the plurality of financial return scores are determined based upon the values 566 and the one or more weights based upon the one or more user preferences, the selected payment option (e.g., the first payment option) may be a payment option with the highest worth (to the first user, for example) with respect to the one or more user preferences.

In some examples, in response to selecting the first payment option for the first transaction, the first transaction may be performed (e.g., automatically performed) using the first payment option. For example, the first transaction may be performed (e.g., automatically performed) using the first payment option without waiting for and/or receiving a confirmation (from the first user) to use the first payment option to perform the first transaction. Alternatively and/or additionally, the first transaction may be performed (e.g., automatically performed) using the first payment option in response to selecting the first payment option and authenticating usage of the first payment option to perform the first transaction. In an example, the authentication may be performed by at least one of receiving authorization to perform the first transaction, receiving authentication information (e.g., a username and/or password, a biometrics reading of a biometrics sensor, such as a fingerprint, etc.) associated with the first user account and/or the first client device 500, etc. In some examples, in response to performing the first transaction using the first payment option, an indication of the first measure of rewards 538 (e.g., a rewards rate and/or a total amount of rewards as a result of performing the first transaction using the first payment option) and/or an indication of the first value 546 (e.g., a value rate and/or a total value as a result of performing the first transaction using the first payment option) may be displayed via the first client device 500.

Figure 5F:
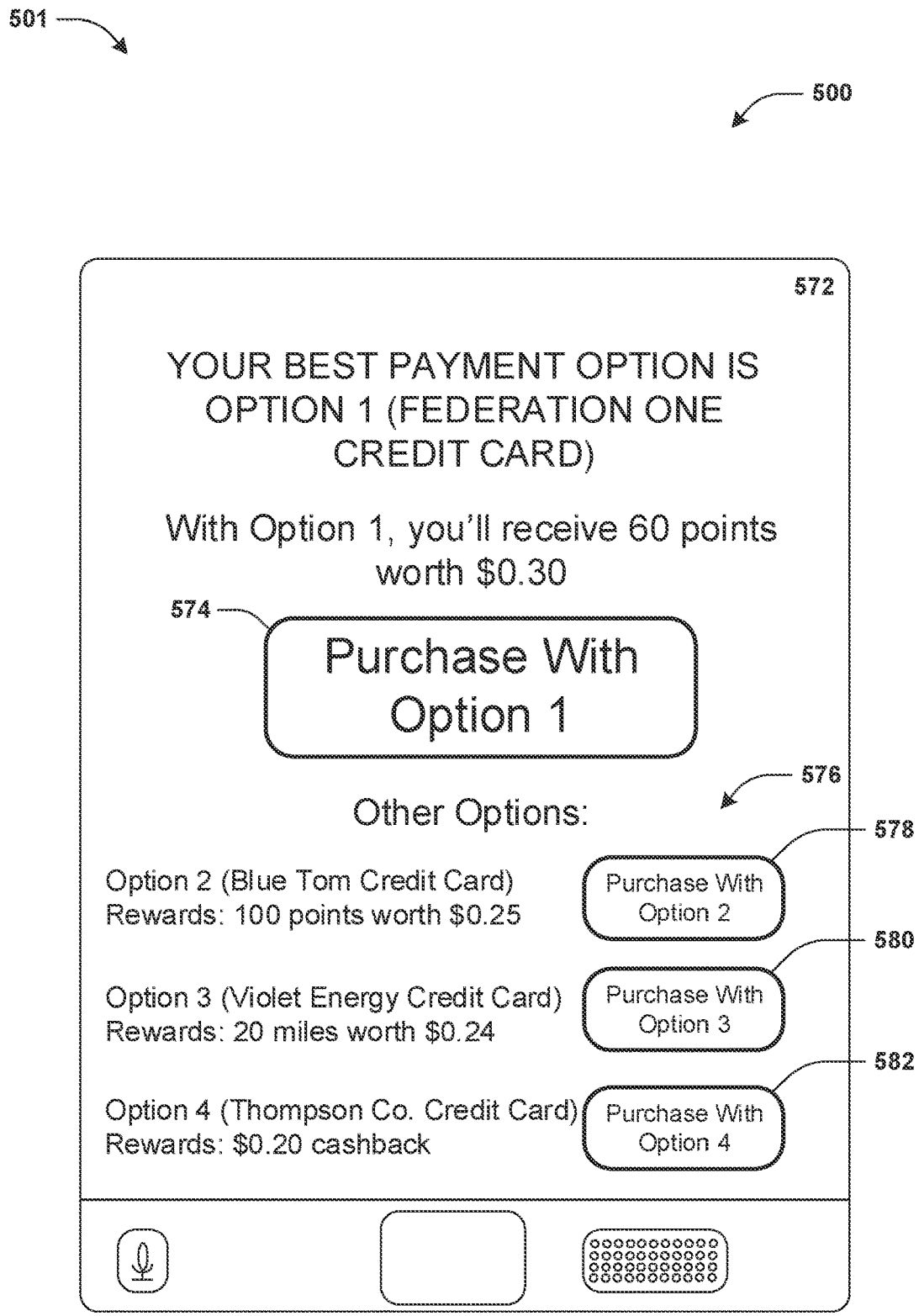
FIG. 5F is a diagram illustrating an exemplary system for determining financial return scores associated with payment options and/or selecting a payment option based upon the financial return scores, where a payment interface is displayed via a first client device.

Alternatively and/or additionally, in response to selecting the first payment option, a payment interface may be displayed via the first client device 500 (and/or a different client device associated with the first user account). For example, as shown in FIG. 5F, the first client device 500 may display the payment interface (shown with reference number 572). The payment interface 572 may comprise an indication that the first payment option (e.g., "Federation One Credit Card") is selected for the first transaction. Alternatively and/or additionally, the payment interface 572 may comprise an indication of the first measure of rewards 538 (e.g., a rewards rate and/or a total amount of rewards as a result of performing the first transaction using the first payment option) and/or the first value 546 (e.g., a value rate and/or a total value as a result of performing the first transaction using the first payment option). Alternatively and/or additionally, the payment interface 572 may comprise a first payment selectable input 574 associated with performing the first transaction using the first payment option. Alternatively and/or additionally, the payment interface 572 may comprise a list 576 of other payment options (that are not selected for the first transaction, for example). For example, the list 576 may comprise a second payment selectable input 578 associated with performing the first transaction using the second payment option, a third payment selectable input 580 associated with performing the first transaction using the third payment option and/or a fourth payment selectable input 582 associated with performing the first transaction using the fourth payment option. Alternatively and/or additionally, for each payment option of the other payment options, the list 576 may comprise an indication of a measure of rewards (e.g., a rewards rate and/or a total amount of rewards as a result of performing the first transaction using the payment option) and/or a value (e.g., a value rate and/or a total value as a result of performing the first transaction using the payment option). In some examples, in response to a selection of the first payment selectable input 574, the second payment selectable input 578, the third payment selectable input 580 or the fourth payment selectable input 582, the first transaction may be performed (e.g., automatically performed) using a payment option associated with the selected selectable input. In an example, in response to a selection of the first payment selectable input 574, the first transaction may be performed using the first payment option. Alternatively and/or additionally, the first transaction may be performed (e.g., automatically performed) using the first payment option in response to selecting the first payment option and authenticating usage of the first payment option to perform the first transaction.

The first transaction may be performed using payment information, associated with the plurality of payment options, stored in a data store (e.g., a data store of the financial system 504 and/or the first client device 500). In some examples, the payment information may be stored securely and/or with encryption. First payment information of the payment information may be associated with the first payment option. For example, the first payment information may comprise information usable to perform transactions (e.g., payments) using the first payment option (e.g., the first transaction may be performed using the first payment information using the first payment information). For example, the first payment information may comprise at least one of an account identifier of the first financial account, a credit card number, a debit card number, a security code, an expiration date, a mailing address, etc. associated with the first payment option. The first transaction may be performed using the first payment information.

In some examples, the first transaction may be performed by interacting and/or communicating with the payment system (e.g., a system configured to perform and/or facilitate the first transaction). For example, at least some of the first payment information associated with the first payment option may be provided (by the financial system 504 and/or the first client device 500, for example) to the payment system to perform the first transaction. In an example, the payment system may comprise at least one of a point of sale system, a point of purchase system, a cloud-based payment system, etc.

In some examples, the first transaction may be performed using one or more first coupons. A coupon of the one or more first coupons (and/or each coupon of the one or more first coupons) may be usable to apply a discount and/or other condition (e.g., free shipping, gift, upgrade, accessory, etc.) for one or more purchases and/or transactions, such as the first transaction. In some examples, the financial system 504 may transmit, to a coupon provider device, a coupon request for one or more coupons related to at least one of one or more items for purchase via the first transaction, the first entity associated with the first transaction, etc. The financial system 504 may receive, from the coupon provider device (in response to the coupon request, for example), a message indicative of a first coupon that is applicable to the first transaction (e.g., it may be determined that the first coupon is applicable to the first transaction based upon a determination that the coupon is applicable to at least one of an item of the one or more items for purchase via the first transaction, the first entity associated with the first transaction, etc.). The first coupon may be included in the one or more first coupons for the first transaction. Alternatively and/or additionally, messages associated with the first user and/or the first user account may be analyzed to identify a message indicative of a second coupon that is applicable to the first transaction (e.g., it may be determined that the second coupon is applicable to the first transaction based upon a determination that the second coupon is applicable to at least one of an item of the one or more items for purchase via the first transaction, the first entity associated with the first transaction, etc.). The second coupon may be included in the one or more first coupons for the first transaction. Alternatively and/or additionally, a third coupon applicable to the first transaction may be identified based upon an image of the third coupon (captured by a camera of the first client device 500, for example) and/or a barcode of the third coupon being scanned, such as using the first client device (e.g., it may be determined that the third coupon is applicable to the first transaction based upon a determination that the third coupon is applicable to at least one of an item of the one or more items for purchase via the first transaction, the first entity associated with the first transaction, etc.). The coupon may be included in the one or more first coupons for the first transaction. In some examples, the first transaction may be performed using the first payment option and the one or more first coupons (e.g., the one or more first coupons may be automatically used to apply a discount and/or other condition).

In some examples, in response to performing the first transaction, the financial account information may be updated based upon the first transaction. For example, at least one of an account balance, a credit card balance, an APR, a rewards balance, etc. associated with the first payment option may be updated in response to performing the first transaction.

In some examples, the financial system 504 may analyze prices associated with the one or more items for purchase via the first transaction. For example, the prices may be determined by accessing and/or analyzing internet resources associated with entities that sell the one or more items. In some examples, in response to identifying a second entity (different than the first entity) that sells an item of the one or more items at a lower price than a price with which the first entity sells the item, the financial system 504 may present a notification via the first client device 500 that is indicative of at least one of the second entity, an internet resource with which the item may be purchased from the second entity, the lower price of the item, etc. In some examples, the prices may be analyzed and/or the notification may be presented in response to receiving the transaction-related request.

In some examples, one, some and/or all of the operations discussed herein with respect to the financial system 504 may be performed by a client device (e.g., the first client device 500) and/or the financial system 504 may be implemented and/or operated by the client device. Alternatively and/or additionally, the financial system 504 may be implemented and/or operated by a server (e.g., hosting a service accessible via a network, such as the Internet).

In some examples, the financial system 504 may manage financial information, select payment options for transactions and/or may provide access to (and/or display) financial information for a plurality of users (comprising the first user, for example), a plurality of user accounts (comprising the first user account, for example) and/or a plurality of client devices (comprising the first client device 500, for example), such as using one or more of the techniques provided herein with respect to the first user, the first user account and/or the first client device 500. For example, each user, each user account and/or each client device may access and/or interact with an interface (e.g., at least one of a financial interface, a transaction interface, a payment interface, etc.) that provides information relevant (and/or personalized to) payment options and/or financial accounts associated with the user, the user account and/or the client device (such as using one or more of the techniques provided herein).

In some examples, information determined using the financial system 504 may be used to determine success levels of promotions, types of rewards, payment options and/or financial institutions. For example, the information may be indicative of at least one of historical transaction information associated with users of the plurality of users, user preferences associated with users of the plurality of users, etc. In an example, a first success level of a first promotion may be higher than a second success level of a second promotion if it is determined (based upon the information, for example) that more transactions are performed with the first promotion applied than with the second promotion applied. Alternatively and/or additionally, a first success level of a first type of reward (e.g., points) may be higher than a second success level of a second type of reward (e.g., miles) if it is determined (based upon the information, for example) that more transactions are performed with promotions associated with the first type of reward than with promotions associated with the second type of reward. New promotions for payment options and/or financial accounts may be designed based upon the success levels. In some examples, the success levels, at least some of the information and/or the new promotions may be provided to one or more financial institution devices associated with one or more financial institutions.

Implementation of at least some of the disclosed subject matter may lead to benefits including, but not limited to, more accurately determining emotions of users based upon videos and/or audio. Some systems attempt to determine emotions of users based upon videos and/or audio by determining features associated with users within the videos and/or comparing the features with a (single) model. How-ever, ways in which people express emotions vary. For example, a first individual may express their emotions, visually and/or via sound, differently than a second individual (e.g., the first individual may be of a culture and/or may have lived in an environment associated with different behaviors and/or different ways of expressing emotions as compared with a culture and/or an environment of the second individual). Accordingly, applying the same model for determining emotions of the first individual and the second individual may lead to inaccurate determinations of emotions. Thus, generating separate user emotion profiles for individuals based upon videos, images and/or audio associated with the individuals and/or using a user emotion profile associated with an individual for determining emotions of the individual may lead to more accurate determinations of the emotions of the individual.

It may be appreciated that the disclosed subject matter may assist a first user (and/or a client device associated with the first user) in managing payment options associated with the first user, automatically selecting payment options for transactions, gaining more value as a result of accurately selecting and/or using payment options that maximize value of rewards provided to the first user, more quickly selecting a payment option and completing a transaction using the payment option, etc.

Implementation of at least some of the disclosed subject matter may lead to benefits including, but not limited to, a reduction in screen space and/or an improved usability of a display (e.g., of the client device). In some examples, the reduction in screen space and/or the improved usability of the display (e.g., of the client device) may be a result of analyzing promotions and/or rewards associated with payment options and/or determining values and/or financial return scores associated with the payment options without requiring a separate window to be opened for each promotion and/or each payment option. Alternatively and/or additionally, the reduction in screen space and/or the improved usability of the display (e.g., of the client device) may be a result of displaying an improved interface (e.g., a payment interface) comprising indications of measures of rewards and/or values of rewards associated with payment options without requiring a separate window to be opened for each payment option. Alternatively and/or additionally, the reduction in screen space and/or the improved usability of the display (e.g., of the client device) may be a result of automatically updating financial account information associated with multiple payment options without requiring the user to open a separate window for each payment option to determine updated information and manually input updated information. Alternatively and/or additionally, the reduction in screen space and/or the improved usability of the display (e.g., of the client device) may be a result of enabling the user to view and/or navigate through financial account information associated with multiple payment options using an improved interface (e.g., a financial interface) without having to open a separate window and/or interface for each payment option, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
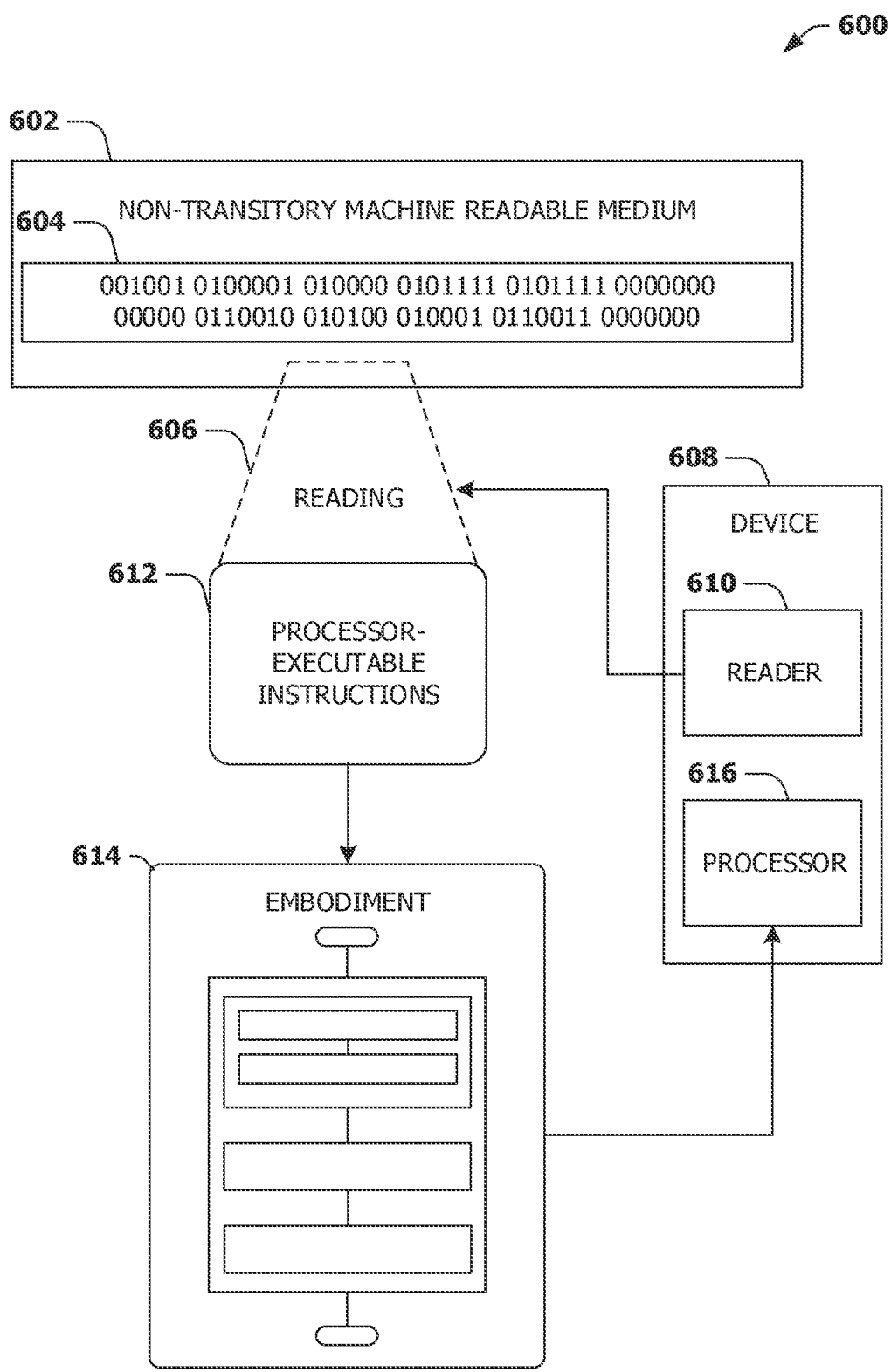
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the exemplary system 501 of FIGS. 5A-5F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computer-implemented method, comprising:

analyzing, by a processor, messages associated with a first user account to identify a promotion message associated with a first payment option associated with the first user account, wherein the messages comprise at least one of emails of a first email account associated with the first user account, instant messages of an instant messaging account associated with the first user account or text messages associated with the first user account;

extracting, by the processor and from the promotion message, information about a first promotion applicable to the first payment option;

in response to determining, by the processor, that the first promotion, extracted from the promotion message and applicable to the first payment option, is not activated for the first payment option, automatically activating, by a financial system, the first promotion applicable to the first payment option by communicating via a network connection with a financial institution device associated with the first payment option;

determining, by the processor and based upon (i) the first promotion applicable to the first payment option and (ii) user financial information associated with one or more other payment options, financial account information associated with a plurality of payment options, comprising the first payment option and the one or more other payment options, associated with the first user account, wherein:
first financial account information of the financial account information is associated with the first payment option of the plurality of payment options; and
the first financial account information is indicative of a first rewards profile associated with transactions performed using the first payment option;
receiving, by the processor, a request associated with a transaction being performed via a first client device associated with the first user account;
detecting, via one or more sensors, a location of the first client device being used to perform the transaction;
determining, by the processor, an area in which the first client device is located based upon a comparison of the location of the first client device with a polygon;
determining, by the processor, a transaction category of the transaction based upon the location of the first client device and the area in which the first client device is located;
in response to determining, by the processor, that each of a plurality of promotions of the first payment option, including the first promotion, is applicable to the transaction category of the transaction determined based upon the location of the first client device and the area in which the first client device is located, including, by the processor, the plurality of promotions of the first payment option in a list of applicable promotions;
determining, by the processor and based upon the financial account information and transaction information associated with the transaction, a plurality of financial return scores associated with the plurality of payment options, wherein a first financial return score of the plurality of financial return scores is based upon the list of applicable promotions, of the first payment option, generated based upon the transaction category determined based upon the location of the first client device;
selecting, by the processor and based upon the plurality of financial return scores and for the transaction being performed via the first client device at the location, the first payment option of the plurality of payment options;
generating, by the processor, a list of other selectable payment options;
in response to the selecting the first payment option for the transaction, providing for display, via the first client device, an interactive payment interface comprising (i) a first selectable input, for the first payment option, that if selected is configured to cause performance of the transaction using the first payment option and (ii) a second selectable input, for a second payment option in the list of other selectable payment options, that if selected is configured to cause performance of the transaction using the second payment option; and
in response to a selection of a selectable input, comprising one of the first selectable input or the second selectable input, in the interactive payment interface, performing the transaction using a payment option corresponding to the selected selectable input.

2. The method of claim 1, wherein:
the first rewards profile is indicative of first promotion information associated with the first promotion; and
the determining the plurality of financial return scores comprises determining the first financial return score based upon the first promotion information and the transaction information.

3. The method of claim 2, wherein:
the determining the financial account information comprises:
transmitting, to a first financial institution device associated with the first payment option, a request for information associated with the first payment option; and
determining the first promotion information associated with the first promotion based upon information received in response to the request for information.

4. The method of claim 1, wherein:
a data store stores first payment information associated with the first payment option and second payment information associated with the second payment option;
the method comprises accessing payment information, in the data store, associated with the payment option corresponding to the selected selectable input; and
the performing the transaction using the payment option is based upon payment information in the data store.

5. The method of claim 4, wherein:
the first payment information comprises at least one of a first account identifier, a first credit card number, a first debit card number, a first security code, a first expiration date or a first mailing address; and
the second payment information comprises at least one of a second account identifier, a second credit card number, a second debit card number, a second security code, a second expiration date or a second mailing address.

6. The method of claim 2, wherein:
second financial account information of the financial account information is associated with a third payment option of the plurality of payment options;
the second financial account information is indicative of a second rewards profile associated with transactions performed using the third payment option;
the second rewards profile is indicative of second promotion information associated with a second promotion of the third payment option; and
the determining the plurality of financial return scores comprises:
determining, based upon the first promotion information, a first measure of rewards associated with using the first payment option to perform the transaction;
determining a first value based upon the first measure of rewards and first valuation information associated with rewards of the first promotion, wherein the first financial return score is based upon the first value;
determining, based upon the second promotion information, a second measure of rewards associated with using the third payment option to perform the transaction; and
determining a second value based upon the second measure of rewards and second valuation information associated with rewards of the second promotion, wherein:
a second financial return score, of the plurality of financial return scores and associated with the third payment option, is based upon the second value; and
the first value and the second value have a same unit of measure.

7. The method of claim 2, wherein:
the first promotion information is indicative of a first end date associated with the first promotion; and
presenting, via the first client device, a notification comprising an indication of the first end date.

8. The method of claim 1, wherein:
the transaction information is indicative of at least one of:
a transaction amount of the transaction;
an item selected for purchase via the transaction; or
an entity with which the transaction is to be performed.

9. The method of claim 8, comprising:
determining at least one of the item or the transaction amount based upon a shopping list associated with the transaction.

10. The method of claim 1, wherein:
the determining the transaction category is based upon a determination that the location of the first client device is within an area associated with at least one of selling one or more items corresponding to the transaction category or an entity corresponding to the transaction category.

11. The method of claim 1, wherein:
the determining the transaction category comprises comparing the location of the first client device with a polygon indicative of geographical boundaries to determine that the location is within the polygon, determining that the polygon is associated with an entity, and determining that the entity corresponds to the transaction category.

12. The method of claim 1, wherein:
the determining the area in which the first client device is located comprises analyzing a database of polygons associated with areas.

13. The method of claim 1, wherein:
the performing the transaction using the payment option comprises communicating with a payment system comprising at least one of a point of sale system, a point of purchase system or a cloud-based payment system.

14. The method of claim 1, wherein:
the first financial account information is indicative of at least one of a credit limit or an account balance associated with the first payment option; and
the method comprises:
determining, based upon a transaction amount of the transaction and at least one of the credit limit or the account balance, whether the first payment option is qualified for the transaction; and
including the first payment option in the plurality of payment options based upon a determination that the first payment option is qualified for the transaction.

15. The method of claim 1, wherein:
the selecting the first payment option is performed based upon a determination that the first financial return score associated with the first payment option is a highest financial return score of the plurality of financial return scores.

16. The method of claim 1, comprising:
identifying a first coupon associated with the transaction, wherein the performing the transaction using the payment option is based upon the first coupon.

17. A computing device comprising:
a processor; and
memory comprising processor-executable instructions that when executed by the processor cause performance of operations, the operations comprising:
analyzing messages associated with a first user account to identify a promotion message associated with a first payment option associated with the first user account, wherein the messages comprise at least one of emails of a first email account associated with the first user account, instant messages of an instant messaging account associated with the first user account or text messages associated with the first user account;

extracting, from the promotion message, information about a first promotion applicable to the first payment option;

in response to determining that the first promotion, extracted from the promotion message and applicable to the first payment option, is not activated for the first payment option, automatically activating, by a financial system, the first promotion applicable to the first payment option by communicating via a network connection with a financial institution device associated with the first payment option;

determining, based upon (i) the first promotion applicable to the first payment option and (ii) user financial information associated with one or more other payment options, financial account information associated with a plurality of payment options, comprising the first payment option and the one or more other payment options, associated with the first user account, wherein:
first financial account information of the financial account information is associated with the first payment option of the plurality of payment options; and
the first financial account information is indicative of a first currency profile associated with transactions performed using the first payment option;

receiving a request associated with a transaction being performed via a first client device associated with the first user account;

detecting, via one or more sensors, a location of the first client device being used to perform the transaction;

determining an area in which the first client device is located based upon a comparison of the location of the first client device with a polygon;

determining a transaction category of the transaction based upon the location of the first client device and the area in which the first client device is located;

in response to determining that each of a plurality of promotions of the first payment option, including the first promotion, is applicable to the transaction category of the transaction determined based upon the location of the first client device and the area in which the first client device is located, including the plurality of promotions of the first payment option in a list of applicable promotions;

determining, based upon the financial account information and transaction information associated with the transaction, a plurality of financial return scores associated with the plurality of payment options, wherein a first financial return score of the plurality of financial return scores is based upon the list of applicable promotions, of the first payment option, generated based upon the transaction category determined based upon the location of the first client device;

selecting, based upon the plurality of financial return scores and for the transaction being performed via the first client device at the location, the first payment option of the plurality of payment options;

generating a list of other selectable payment options;

in response to the selecting the first payment option for the transaction, providing for display, via the first client device, an interactive payment interface comprising (i) a first selectable input, for the first payment option, that if selected is configured to cause performance of the transaction using the first payment option and (ii) a second selectable input, for a second payment option in the list of other selectable payment options, that if selected is configured to cause performance of the transaction using the second payment option; and in response to a selection of a selectable input, comprising one of the first selectable input or the second selectable input, in the interactive payment interface, performing the transaction using a payment option corresponding to the selected selectable input.

18. The computing device of claim 17, wherein:

the performing the transaction using the payment option comprises communicating with a payment system comprising at least one of a point of sale system, a point of purchase system or a cloud-based payment system.

19. A non-transitory machine readable medium having stored thereon processor-executable instructions that when executed cause performance of operations, the operations comprising:

analyzing messages associated with a first user account to identify a promotion message associated with a first payment option associated with the first user account, wherein the messages comprise at least one of emails of a first email account associated with the first user account, instant messages of an instant messaging account associated with the first user account or text messages associated with the first user account;

extracting, from the promotion message, information about a first promotion applicable to the first payment option;

determining, based upon (i) the first promotion applicable to the first payment option and (ii) user financial information associated with one or more other payment options, financial account information associated with a plurality of payment options, comprising the first payment option and the one or more other payment options, associated with the first user account, wherein:

first financial account information of the financial account information is associated with the first payment option of the plurality of payment options; and the first financial account information is indicative of a first rewards profile associated with transactions performed using the first payment option;

receiving a request associated with a transaction being performed via a first client device associated with the first user account;

detecting, via one or more sensors, a location of the first client device being used to perform the transaction;

determining an area in which the first client device is located based upon a comparison of the location of the first client device with a polygon;

determining a transaction category of the transaction based upon the location of the first client device and the area in which the first client device is located;

in response to determining that the first promotion applicable to the first payment option is applicable to the transaction category of the transaction determined based upon the location of the first client device and the area in which the first client device is located, determining, based upon the financial account information and transaction information associated with the transaction, a plurality of financial return scores associated with the plurality of payment options, wherein a first financial return score of the plurality of financial return scores is associated with the first payment option;

selecting, based upon the plurality of financial return scores and for the transaction being performed via the first client device at the location, the first payment option of the plurality of payment options;

generating a list of other selectable payment options;

in response to the selecting the first payment option for the transaction, providing for display, via the first client device, an interactive payment interface comprising (i) a first selectable input, for the first payment option, that if selected is configured to cause performance of the transaction using the first payment option and (ii) a second selectable input, for a second payment option in the list of other selectable payment options, that if selected is configured to cause performance of the transaction using the second payment option; and in response to a selection of a selectable input, comprising one of the first selectable input or the second selectable input, in the interactive payment interface, performing the transaction using a payment option corresponding to the selected selectable input.

20. The non-transitory machine readable medium of claim 19, wherein:

the performing the transaction using the payment option comprises communicating with a payment system comprising at least one of a point of sale system, a point of purchase system or a cloud-based payment system.

* * * * *